(12) United States Patent
Yang et al.

(10) Patent No.: US 9,854,580 B2
(45) Date of Patent: Dec. 26, 2017

(54) EFFICIENT RESOURCE ALLOCATION

(71) Applicant: QUALCOMM Incorporated, San Diego, CA (US)

(72) Inventors: Lin Yang, San Diego, CA (US); Bin Tian, San Diego, CA (US); Jialing Li Chen, San Diego, CA (US); Sameer Vermani, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 39 days.

(21) Appl. No.: 14/845,230

(22) Filed: Sep. 3, 2015

(65) Prior Publication Data

US 2016/0073387 A1    Mar. 10, 2016

Related U.S. Application Data

(60) Provisional application No. 62/046,154, filed on Sep. 4, 2014.

(51) Int. Cl.
*H04W 72/04*    (2009.01)
*H04L 5/00*    (2006.01)
*H04L 27/26*    (2006.01)

(52) U.S. Cl.
CPC ......... *H04W 72/044* (2013.01); *H04L 5/0037* (2013.01); *H04L 5/0039* (2013.01); *H04L 5/0044* (2013.01); *H04L 5/0048* (2013.01); *H04L 5/0094* (2013.01); *H04L 5/0007* (2013.01); *H04L 27/2601* (2013.01)

(58) Field of Classification Search
CPC . H04W 84/12; H04W 72/0453; H04W 88/08; H04W 72/04; H04W 72/044; H04L 5/0007; H04L 5/0048; H04L 5/0044

USPC ................. 370/329, 295, 319, 343
See application file for complete search history.

(56) References Cited

U.S. PATENT DOCUMENTS

| | | | | |
|---|---|---|---|---|
| 2006/0120473 | A1* | 6/2006 | Baum ....................... | H04L 1/04 375/260 |
| 2007/0253321 | A1* | 11/2007 | Akita ..................... | H04B 7/022 370/208 |
| 2013/0266083 | A1* | 10/2013 | Baik ..................... | H04L 5/0053 375/260 |
| 2015/0349995 | A1* | 12/2015 | Zhang ................... | H04L 5/0048 375/295 |

(Continued)

FOREIGN PATENT DOCUMENTS

WO    2011136207 A1    11/2011

OTHER PUBLICATIONS

International Search Report and Written Opinion—PCT/US2015/048543—ISA/EPO—dated Nov. 27, 2015 (147053WO).

*Primary Examiner* — Charles C Jiang
*Assistant Examiner* — Will Lin
(74) *Attorney, Agent, or Firm* — Arent Fox LLP

(57) ABSTRACT

In an aspect of the disclosure, a method, a computer-readable medium, and an apparatus are provided. The apparatus may be a wireless device. The wireless device determines a first subset of resource units (RUs) of a set of RUs that extends across a bandwidth of a channel in a transmission time period, the first subset of RUs including less RUs than the set of RUs, each RU of the set of RUs including at least 26 tones. The wireless device communicates at least one of data or control information in the first subset of the RUs.

84 Claims, 24 Drawing Sheets

(56) References Cited

U.S. PATENT DOCUMENTS

| | | | | |
|---|---|---|---|---|
| 2015/0365203 A1* | 12/2015 | Suh | ...................... | H04L 5/0007 370/330 |
| 2015/0365947 A1* | 12/2015 | Suh | ...................... | H04L 5/0007 370/208 |
| 2015/0381330 A1* | 12/2015 | Chen | ..................... | H04L 5/0046 370/329 |

* cited by examiner

EFFICIENT RESOURCE ALLOCATION

CROSS-REFERENCE TO RELATED APPLICATION(S)

This application claims the benefit of U.S. Provisional Application Ser. No. 62/046,154, entitled "EFFICIENT RESOURCE ALLOCATION" and filed on Sep. 4, 2014, which is expressly incorporated by reference herein in its entirety.

BACKGROUND

Field

The present disclosure relates generally to communication systems, and more particularly, to allocating bandwidth resources in an efficient manner.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

In an aspect of the disclosure, a method, a computer-readable medium, and an apparatus are provided. The apparatus may be a wireless device. The wireless device determines a first subset of resource units (RUs) of a set of RUs that extends across a bandwidth of a channel in a transmission time period, the first subset of RUs including less RUs than the set of RUs, each RU of the set of RUs including at least 26 tones. The wireless device communicates at least one of data or control information in the first subset of the RUs.

DETAILED DESCRIPTION

Figure 1:
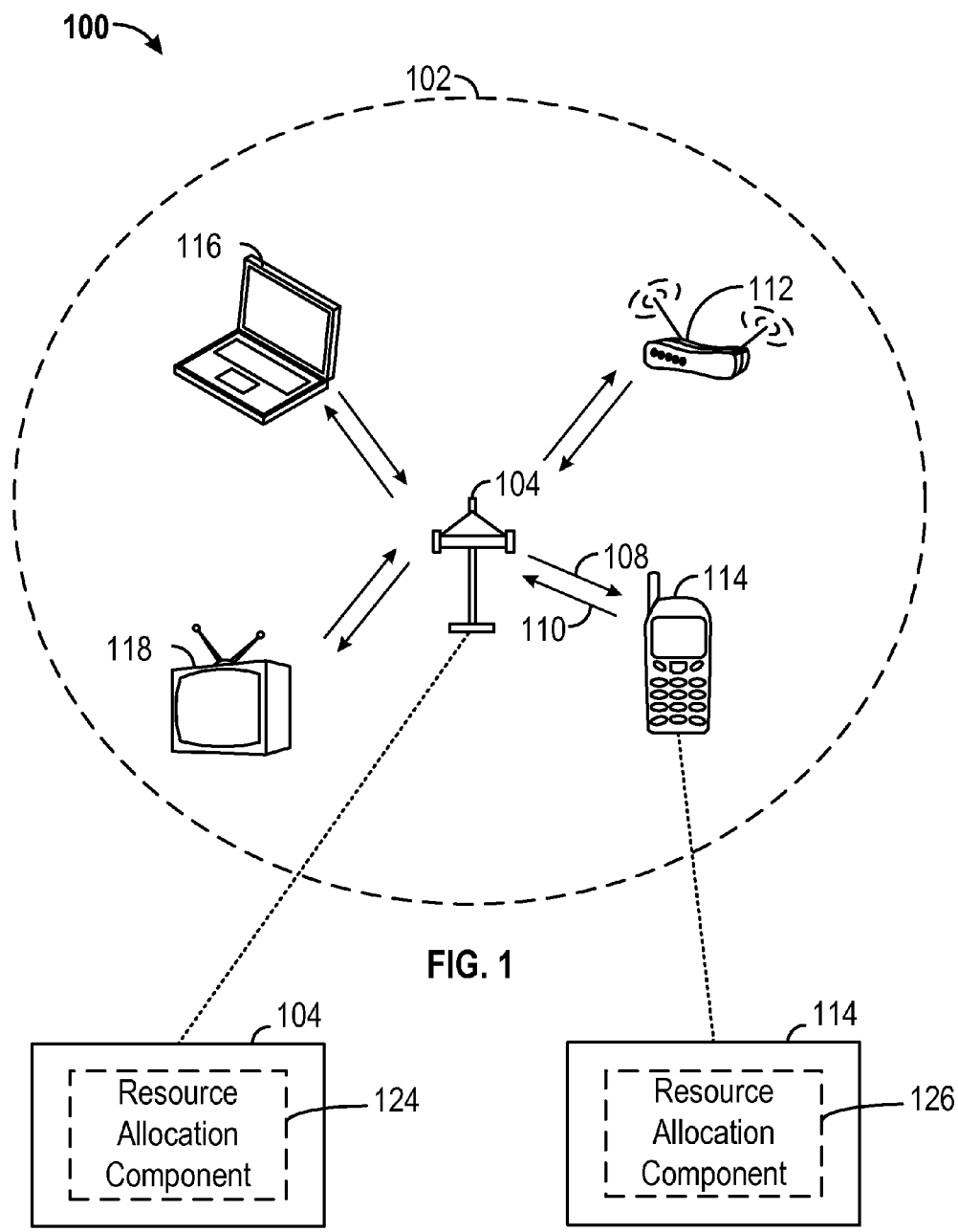
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer-readable media, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point may also include, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also include, be implemented as, or known as an access terminal (AT), a subscriber station, a subscriber unit, a mobile station, a remote station, a remote terminal, a user terminal, a user agent, a user device, a user equipment, or some other terminology. In some implementations an access terminal may include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., WiFi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams, and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Certain of the devices described herein may further implement Multiple Input Multiple Output (MIMO) technology and be implemented as part of the 802.11 standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min \{N_T, N_R\}$ Each of the $N_S$ independent channels corresponds to a dimension. The MIMO system can provide improved performance (e.g., higher throughput and/or greater reliability) if the additional dimensionalities created by the multiple transmit and receive antennas are utilized.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a resource allocation component 124 configured to perform procedures related to allocating resources of a bandwidth to at least one station (e.g., STAs 112, 114, 116, 118) for communication and indicating the allocated resources to the at least one station. The resource allocation component 124 may control a process of determining a first subset of RUs of a set of RUs that extends across a bandwidth of a channel in a transmission time period, the first subset of RUs including less RUs than the set of RUs, each RU of the set of RUs including at least 26 tones. The resource allocation component 124 may also control a process of communicating at least one of data or control information in the first subset of the RUs.

In another aspect, the STA 114 may include one or more components for performing various functions. For example, the STA 114 may include a resource allocation component 126 configured to perform procedures related to determining a resource allocation of a bandwidth for communication with an access point (e.g., AP 104). The resource allocation component 126 may control a process of determining a first subset of RUs of a set of RUs that extends across a bandwidth of a channel in a transmission time period, the first subset of RUs including less RUs than the set of RUs, each RU of the set of RUs including at least 26 tones. The resource allocation component 126 may also control a process of communicating at least one of data or control information in the first subset of the RUs.

Figure 2:
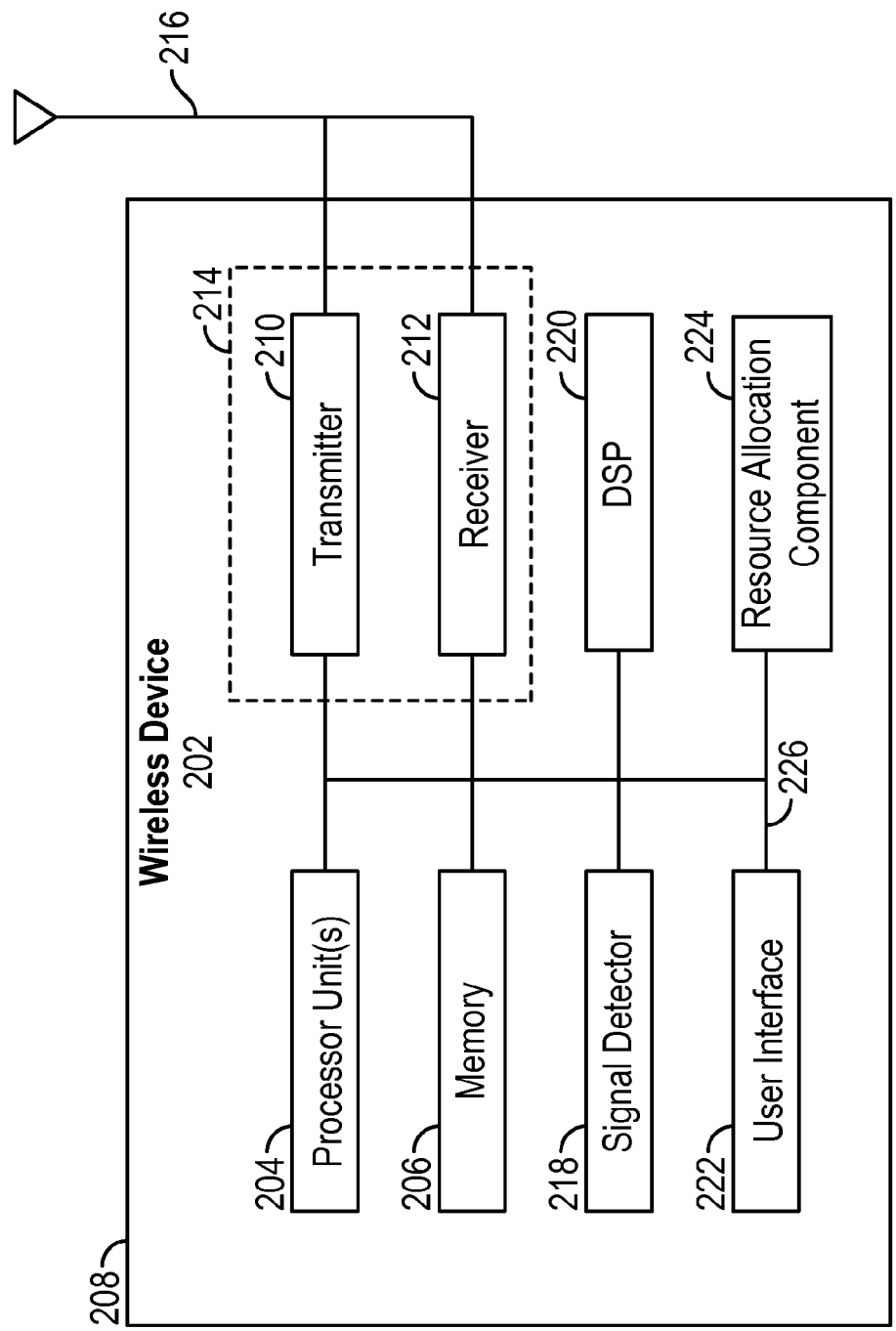
FIG. 2 is a functional block diagram of a wireless device that may be employed within the wireless communication system of FIG. 1.

FIG. 2 is a functional block diagram of a wireless device 202 that may be employed within the wireless communication system 100 of FIG. 1. The wireless device 202 is an example of a device that may be configured to implement the various methods described herein. For example, the wireless device 202 may include the AP 104 or any one of the STAs 112, 114, 116, or 118.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable (by the processor 204, for example) to implement the methods described herein.

When the wireless device 202 is implemented as an AP or a STA, the resource allocation component 224 may control a process of determining a first subset of RUs of a set of RUs that extends across a bandwidth of a channel in a transmission time period, the first subset of RUs including less RUs than the set of RUs, each RU of the set of RUs including at least 26 tones. The resource allocation component 224 may also control a process of communicating at least one of data or control information in the first subset of the RUs.

The processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote device. The transmitter 210 and the receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used to detect and quantify the level of signals received by the transceiver 214 or the receiver 212. The signal detector 218 may detect such signals as total energy, energy per subcarrier per symbol, power spectral density, and other signals. The wireless device 202 may also include a digital signal processor (DSP) 220 for use in processing signals. The DSP 220 may be configured to generate a packet for transmission. In some aspects, the packet may include a physical layer data unit (PPDU).

The wireless device 202 may further include a user interface 222 in some aspects. The user interface 222 may include a keypad, a microphone, a speaker, and/or a display. The user interface 222 may include any element or component that conveys information to a user of the wireless device 202 and/or receives input from the user.

The wireless device 202 may also include a resource allocation component 224. When the wireless device 202 is implemented as an AP (e.g., AP 104), the resource allocation component 224 may be configured to perform procedures, via the processor 204 and/or the transceiver 214, related to allocating resources of a bandwidth to at least one station (e.g., STAs 112, 114, 116, 118) for communication and indicating the allocated resources to the at least one station. When the wireless device 202 is implemented as a STA (e.g., any one of STAs 112, 114, 116, or 118), the resource allocation component 224 may be configured to perform procedures, via the processor 204 and/or the transceiver 214, related to determining a resource allocation of a bandwidth for communication with an AP (e.g., AP 104).

The various components of the wireless device 202 may be coupled together by a bus system 226. The bus system 226 may include a data bus, for example, as well as a power bus, a control signal bus, and a status signal bus in addition to the data bus. Components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218, the DSP 220, the user interface 222, and/or the resource allocation component 224. Further, each of the components illustrated in FIG. 2 may be implemented using a plurality of separate elements.

Figure 3:
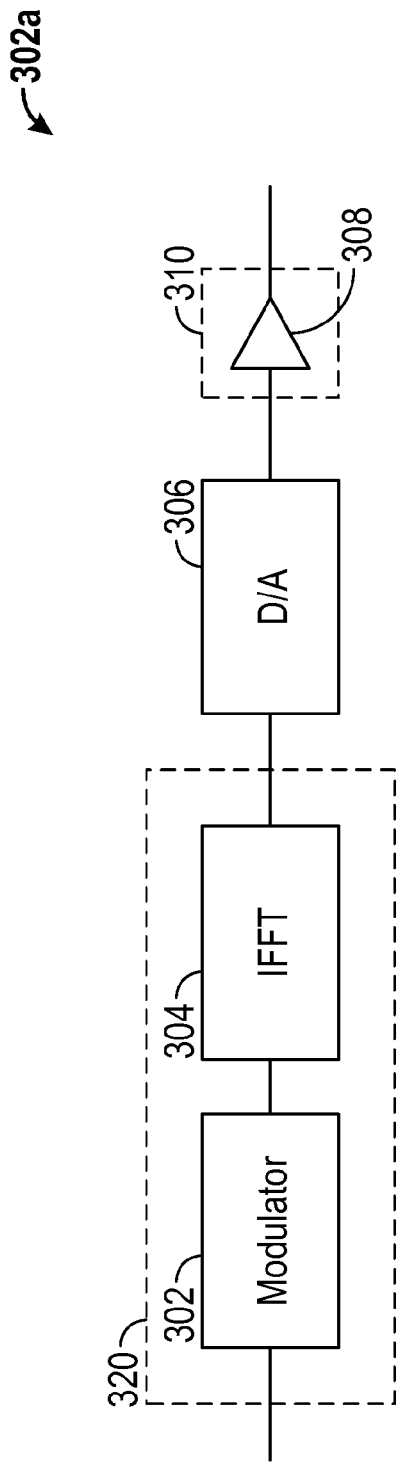
FIG. 3 illustrates various components that may be utilized in a wireless device to transmit wireless communications.

As discussed above, the wireless device 202 may include an AP 104 or an STA 114, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to generate and transmit packets to be sent over a bandwidth of 20 MHz, 40 MHz, 80 MHz, or higher, as will be discussed in additional detail below. For ease of reference, the wireless device 202 configured with the components illustrated in FIG. 3 is hereinafter referred to as a wireless device 302a.

The wireless device 302a may include a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 includes a QAM (quadrature amplitude modulation) modulator, for example a 16-QAM modulator or a 64-QAM modulator. In other aspects, the modulator 302 includes a binary phase-shift keying (BPSK) modulator or a quadrature phase-shift keying (QPSK) modulator.

The wireless device 302a may further include a transform component 304 configured to convert symbols or otherwise modulated bits from the modulator 302 into a time domain. In FIG. 3, the transform component 304 is illustrated as being implemented by an inverse fast Fourier transform (IFFT) component. In some implementations, there may be multiple transform components (not shown) that transform units of data of different sizes. In some implementations, the transform component 304 may be itself configured to transform units of data of different sizes. For example, the transform component 304 may be configured with a plurality of modes, and may use a different number of points to convert the symbols in each mode. For example, the IFFT may have a mode where 26 points are used to convert symbols being transmitted over 26 tones (e.g., subcarriers) into a time domain, and a mode where 242 points are used to convert symbols being transmitted over 242 tones into a time domain. The number of points used by the transform component 304 may be referred to as the size of the transform component 304.

In FIG. 3, the modulator 302 and the transform component 304 are illustrated as being implemented in the DSP 320. In some aspects, however, one or both of the modulator 302 and the transform component 304 are implemented in the processor 204 or in another element of the wireless device 302a (e.g., see describe above with reference to FIG. 2).

As discussed above, the DSP 320 may be configured to generate a data unit for transmission. In some aspects, the modulator 302 and the transform component 304 may be configured to generate a data unit including a plurality of fields including control information and a plurality of data symbols. The fields including the control information may include one or more training fields, for example, and one or more signal (SIG) fields. Each of the training fields may include a known sequence of values or symbols. Each of the SIG fields may include information about the data unit, for example a description of a length or data rate of the data unit.

Returning to the description of FIG. 3, the wireless device 302a may further include a digital to analog converter 306 configured to convert the output of the transform component into an analog signal. For example, the time-domain output of the transform component 304 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 includes a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform component 304 as discussed above. Data units that may be generated and transmitted as discussed above are described in additional detail below with respect to Figures described infra.

Figure 4:
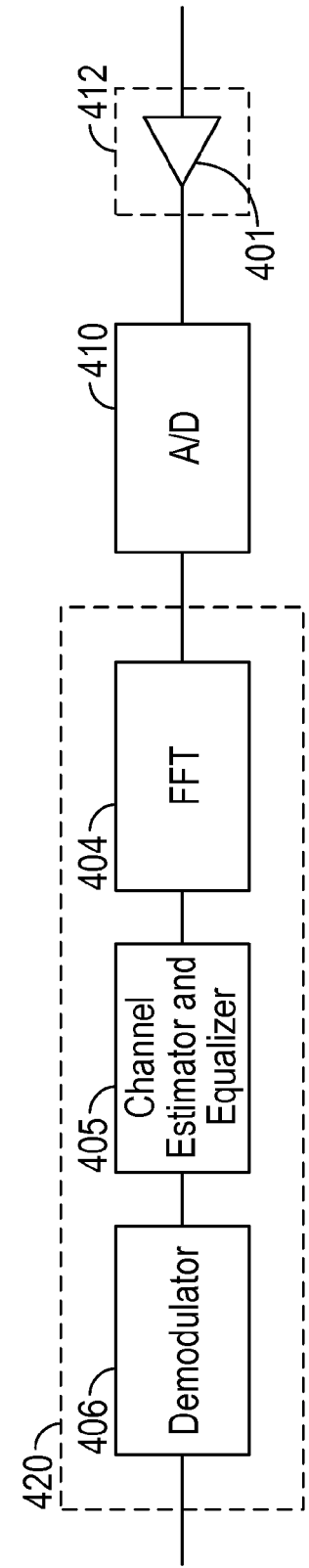
FIG. 4 illustrates various components that may be utilized in a wireless device to receive wireless communications.

FIG. 4 illustrates various components that may be utilized in the wireless device 202 to receive wireless communications. The components illustrated in FIG. 4 may be used, for example, to receive OFDM communications. In some aspects, the components illustrated in FIG. 4 are used to receive data units over a bandwidth of 20 MHz, 40 MHz, 80 MHz, or higher. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 402b.

The receiver 412 is configured to receive one or more packets or data units in a wireless signal. Data units that may be received and decoded or otherwise processed as discussed below are described in additional detail with respect to Figures described infra.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 includes an LNA.

The wireless device 402b may include an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 402b. In some aspects, the analog to digital converter 410 is implemented in the transceiver 214 (FIG. 2) or in a data receive processor.

The wireless device 402b may further include a transform component 404 configured to convert the representation the wireless signal into a frequency spectrum. In FIG. 4, the transform component 404 is illustrated as being implemented by a fast Fourier transform (FFT) component. As described above with reference to FIG. 3, the transform component 404 may be configured with a plurality of modes, and may use a different number of points to convert the signal in each mode. For example, the transform component 404 may have a mode where 26 points are used to convert a signal received over 26 tones into a frequency spectrum, and a mode where 242 points are used to convert a signal received over 242 tones into a frequency spectrum. The number of points used by the transform component 404 may be referred to as the size of the transform component 404. In some aspects, the transform component 404 may identify a symbol for each point that it uses.

The wireless device 402b may further include a channel estimator and equalizer 405 configured to form an estimate of the channel over which the data unit is received, and to remove certain effects of the channel based on the channel estimate. For example, the channel estimator and equalizer 405 may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 402b may further include a demodulator 406 configured to demodulate the equalized data. For example, the demodulator 406 may determine a plurality of bits from symbols output by the transform component 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 includes a QAM (quadrature amplitude modulation) demodulator, for example a 16-QAM demodulator or a 64-QAM demodulator. In other aspects, the demodulator 406 includes a binary phase-shift keying (BPSK) demodulator or a quadrature phase-shift keying (QPSK) demodulator.

In FIG. 4, the transform component 404, the channel estimator and equalizer 405, and the demodulator 406 are illustrated as being implemented in a DSP 420. In some aspects, however, one or more of the transform component 404, the channel estimator and equalizer 405, and the demodulator 406 are implemented in the processor 204 (FIG. 2) or in another element of the wireless device 202 (FIG. 2).

As discussed above, the wireless signal received at the receiver 212 includes one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform component 404, the channel estimator and equalizer 405, and the demodulator 406.

Data units exchanged by the AP 104 and the STA 114 may include control information or data, as discussed above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 302a shown in FIG. 3 shows an example of a single transmit chain to be transmitted over an antenna. In some implementations, the wireless device 302a may implement a portion of a MIMO system using multiple antennas to simultaneously transmit data.

Figure 5:
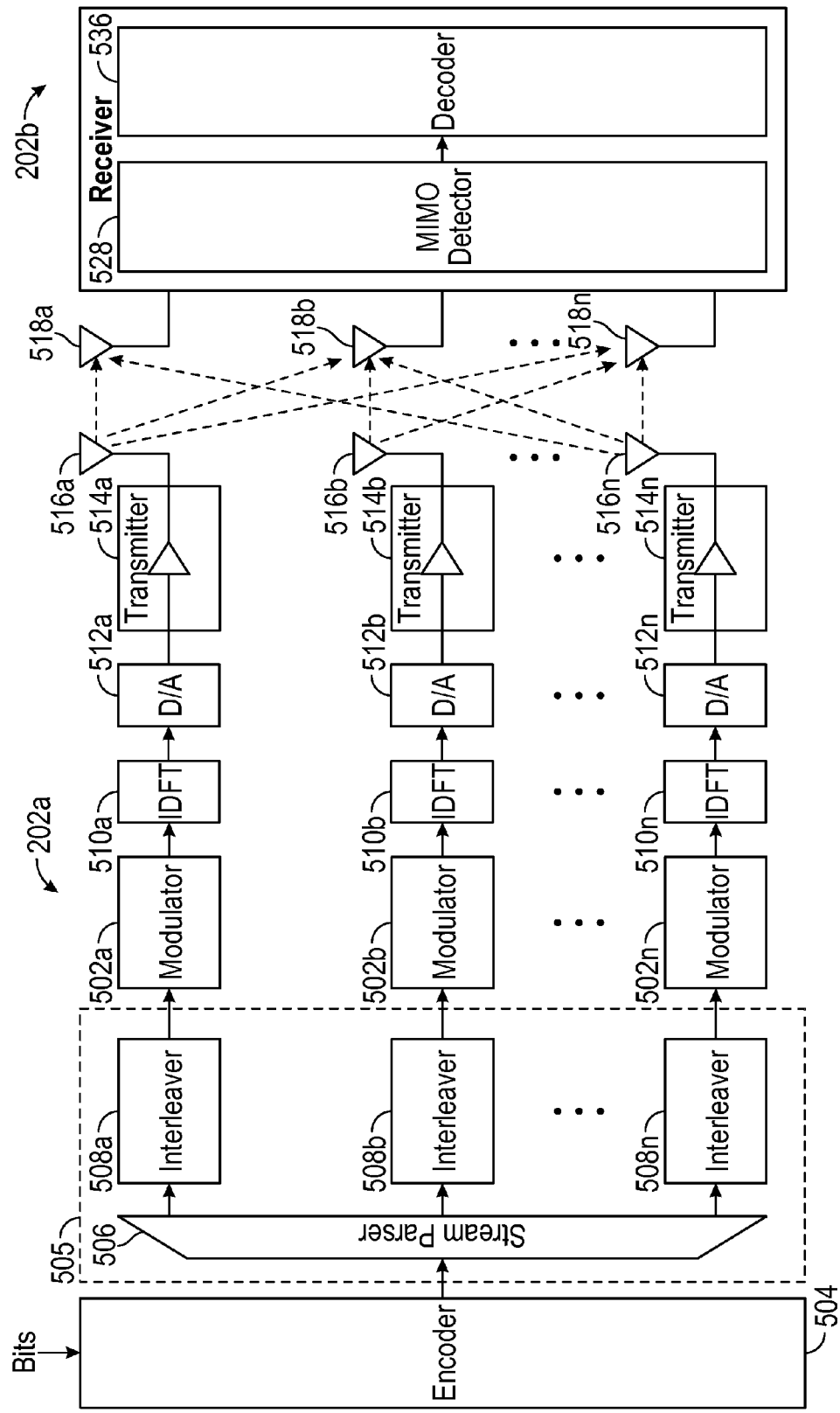
FIG. 5 is a functional block diagram of a MIMO system that may be implemented in wireless devices such as the wireless device of FIG. 2 to transmit and receive wireless communications.

FIG. 5 is a functional block diagram of a MIMO system that may be implemented in wireless devices such as the wireless device 202 of FIG. 2 to transmit and receive wireless communications. The MIMO system may make use of some or all of the components described with reference to FIG. 3. Bits for transmission that are to be received at an output of the receiver are provided to an encoder 504. The encoder 504 may apply a forward error correcting (FEC) code on the bit stream. The FEC code may be a block code, a convolutional code, or the like. The encoded bits are provided to an interleaving system 505 that distributes the encoded bits into N transmit streams.

The interleaving system 505 includes a stream parser 506 that parses an input bit stream from the encoder 504 to N spatial stream interleavers 508a, 508b, and 508n. The stream parser 506 may be provided with the number of spatial streams and parse bits on a round-robin basis. Other parsing functions may also be used. One parsing function that may be used is $k_n = N_{TX}*k+n$ (e.g., round-robin with one bit per spatial stream, then on to the next spatial stream where $k_n$ is the input bit index and $N_{TX}$ is the number of transmitters/spatial streams). Another more general function f(k,n) might also be used, for example, sending two bits to a spatial stream, then moving on to the next spatial stream. Each interleaver 508a, 508b, and 508n may each thereafter distribute bits so that errors may be recovered due to fading or other channel conditions. Hereinafter the interleavers 508a, 508b, and 508n may be referred to an interleaver 508.

Each transmit stream may then be modulated by a modulator 502a, 502b, or 502n. As described above with reference to FIG. 3, the bits may be modulated using modulation techniques such as QPSK (Quaternary Phase Shift Keying) modulation, BPSK (mapping one bit at a time), 16-QAM (mapping group of six bits), 64-QAM, and the like. The modulated bits for each stream may be provided to transform components 510a, 510b, and 510n. In some implementations, the transform components 510a, 510b, and 510n may perform an inverse discrete time fourier transform (IDFT) to convert the modulated bits from a frequency domain into a time domain. The transform components 510a, 510b, and 510n may operate according to different modes as described above with reference to FIG. 3. For example, the transform components 510a, 510b, and 510n may be configured to operate according to a 26 point mode or a 242 point mode. In some implementations, the modulated bits may be encoded using space time block coding (STBC) and spatial mapping may be performed before being provided to transform components 510a, 510b, and 510n. After the modulated bits have been converted into time domain signals for each spatial stream, the time domain signal may be converted into an analog signal via converters 512a, 512b, and 512n as described above with reference to FIG. 3. The signals may then be transmitted using transmitters 514a, 514b, and 514c and using antennas 516a, 516b, or 516n, into a wireless radio space over a desired frequency bandwidth (e.g., 20 MHz, 40 MHz, 80 MHz, or higher).

In some embodiments, antennas 516a, 516b, and 516n are distinct and spatially separated antennas. In other embodiments, distinct signals might be combined into different polarizations off of fewer than N antennas. An example of this is where spatial rotation or spatial spreading is done, where multiple spatial streams are mapped on a single antenna. In any case, it should be understood that distinct spatial streams can be organized in different manners. For example, a transmit antenna might carry data from more than one spatial stream or several transmit antennas might carry data from a spatial stream. For example, consider the case of a transmitter with four transmit antennas and two spatial streams. Each spatial stream can be mapped onto two transmit antennas in that case, so two antennas are carrying data from just one spatial stream.

Figure 6:
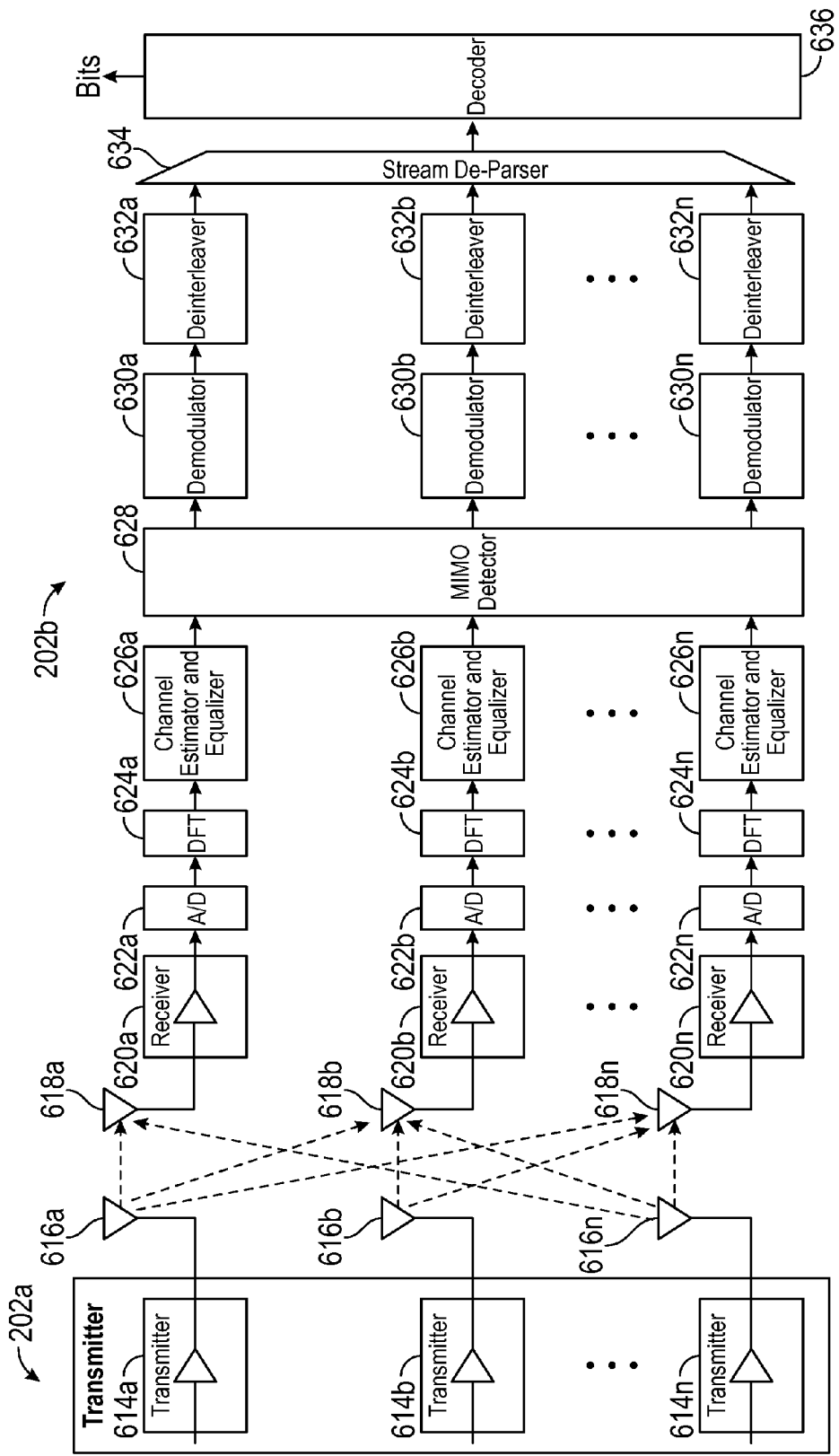
FIG. 6 is a functional block diagram of an exemplary MIMO system that may be implemented in wireless devices such as the wireless device of FIG. 2 to receive wireless communications.

FIG. 6 is a functional block diagram of an exemplary MIMO system that may be implemented in wireless devices such as the wireless device 202 of FIG. 2 to receive wireless communications. The wireless device 202b may be configured to simultaneously receive transmissions from the antennas 516a, 516b, and 516n of FIG. 5. A wireless device 202b receives signals from the channel at N antennas 518a, 518b, and 518n (counting separate polarizations, as appropriate) coupled to N receive circuits. The signals are then provided to receivers 620a, 620b, and 620n that each may include an amplifier configured to amplify the received signals. The signals may then be converted into a digital form via converters 622a, 622b, and 622n.

Converted signals may then be converted into a frequency spectrum via transform components 624a, 624b, and 624n. As described above, the transform components 624a, 624b, and 624n may operate according to various modes according to the size and bandwidth used (e.g., 26 point, 242 point, etc.). The transformed signals may be provided to respective channel estimator and equalizer blocks 626a, 626b, and 626n that may function similarly as described above with reference to FIG. 4. After channel estimation, the outputs may be provided to a MIMO detector 628 which may thereafter provide its output to demodulators 630a, 630b, and 630n which may demodulate the bits according to one of the modulation techniques as described above. Demodulated bits may then be provided to deinterleavers 632a, 632b, and 632n which may pass bits into a stream de-parser 634 which may provide the bits into a single bit stream into a decoder 636 that may decode the bits into an appropriate data stream.

As described above, data units exchanged by the AP 104 and the STA 114 may include control information or data, as discussed above in the form of physical (PHY) layer packets or physical layer protocol data units (PPDUs).

Figure 7:
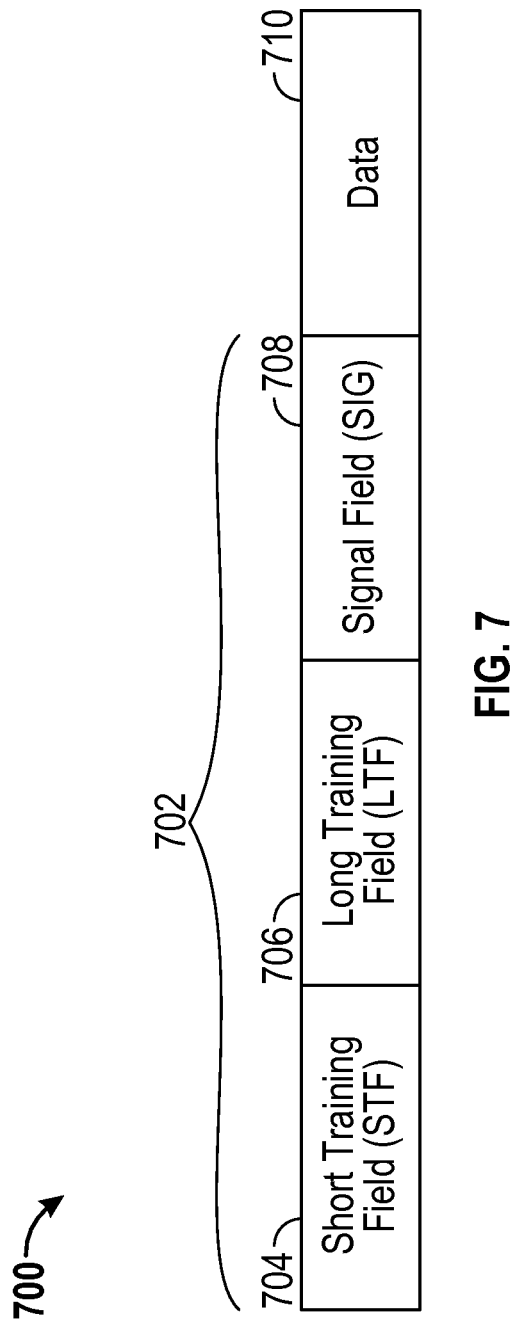
FIG. 7 is a block diagram showing an exemplary structure of a physical layer packet.

FIG. 7 is a block diagram showing an exemplary structure of a preamble 702 and payload 710 of a physical layer packet 700. The preamble 702 may include a short training field (STF) 704 that includes an STF sequence of known values. In some aspects, the STF may be used for packet detection (e.g., to detect the start of a packet) and for coarse time/frequency estimation. The STF sequence may be optimized to have a low PAPR and include a subset of non-zero tones with a particular periodicity. The STF 704 may span one or multiple OFDM symbols. The preamble 702 may further include a long training field (LTF) 706 that may span one or multiple OFDM symbols and may include one or more LTF sequences of known non-zero values. The LTF may be used for channel estimation, fine time/frequency estimation, and mode detection. The preamble 702 may further include a signal field (SIG) 708 as described above that may include a number of bits or values used in one aspect for mode detection purposes and determination of transmission parameters.

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. In particular, the tones described infra may be OFDM tones.

Figure 8:
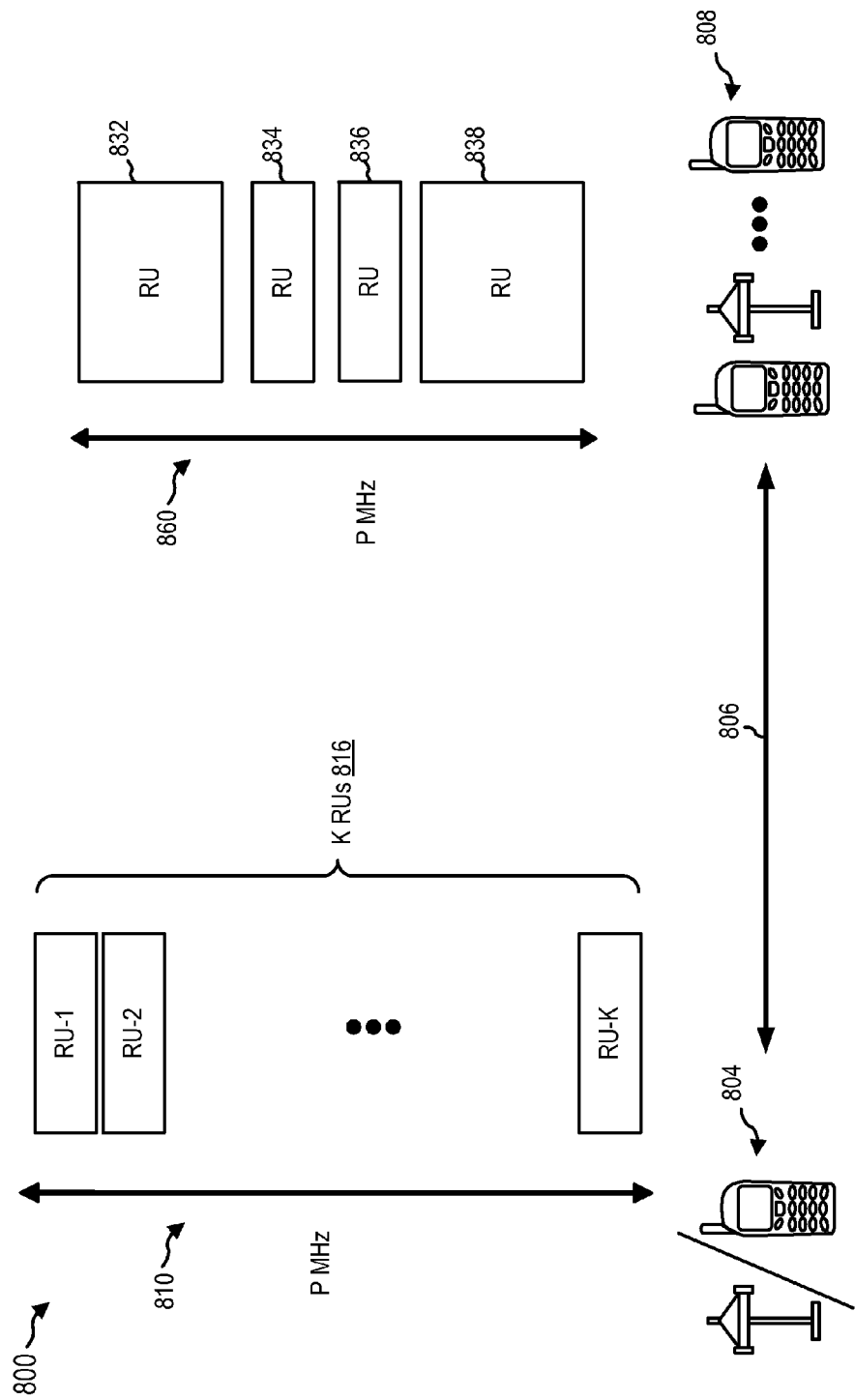
FIG. 8 is a diagram illustrating resource allocation on a channel of a WLAN.

Various methods for OFDMA resource allocation will now be described. FIG. 8 is a diagram 800 illustrating resource allocation on a channel of a WLAN. A wireless device 804 (e.g., the AP 104 or the STA 114) may utilize OFDMA to communicate with one or more wireless devices 808 (e.g., users) on a channel 806 in a WLAN. In particular, the wireless device 804 may communicate with the one or more wireless devices 808 on the channel 806 of a particular bandwidth, e.g., P MHz, in accordance with one or more resource allocations as described infra referring to FIGS. 8-20. As an example, P MHz may be 20 MHz, 40 MHz, or 80 MHz. FIG. 8 shows exemplary resource allocation 810 and resource allocation 860. In the resource allocation 810, the channel 806 may be divided into K RUs 816 (e.g., RU-1 816 to RU-K 816). K is an integer greater than 0. Each RU 816 may occupy a predetermined number of time slots (or a time period) and respective N tones (subcarriers). As an example, in certain configurations, N may be 26, 52, 106, 242, 484, or 996. Each RU 816 may have a size that is the same as, or different from, the size of another RU 816. For example, the RU-1 816 and the RU-K 816 may be same size (e.g., 26 tones), and the RU-2 816 may be a different size (e.g., 52 tones).

Further, the wireless device 804 may allocate one or more RUs 816 for communication with a respective different wireless devices 808. As an example, the RU-1 816 to RU-3 816 may be allocated to a first wireless device 808. The RU-4 816 to RU-6 816 may be allocated to a second wireless device 808. The RU-7 816 to RU-K 816 may be allocated to a third wireless device 808. In certain configurations, the wireless device 804 may transmit a physical layer packet 700 shown in FIG. 7 to a particular wireless device 808. The payload 710 of the physical layer packet 700 may carry the RUs 816 that are allocated to the communication between the wireless device 804 the particular wireless device 808 and that have data to be communicated. In addition, when using MIMO, a single RU 816 may be allocated to one or more wireless devices 808. The wireless device 804 may transmit information indicating the determined channel allocation to each wireless device 808 in a frame (e.g., a control frame, a management frame, or a data frame). Upon receiving the information, each wireless device 808 may use the allocated RUs to communicate data (e.g., control data/signaling, and/or payload data) with the wireless device 804.

As described infra, in certain configurations, the channel 806 may be divided into RUs of 26 tones. The 26 tones may include 24 data tones and 2 pilot tones. In certain configurations, the channel 806 may also be divided into RUs of 242 tones. The 242 tones may include 234 data tones and 8 pilot tones. In certain configurations, the channel 806 may be divided into RUs of 484 tones. The 484 tones may include 468 data tones and 16 pilot tones.

Further, for a channel 806 of a particular bandwidth (e.g., P MHz), the size of an RU in the RUs 816 may be a function of the bandwidth. As an example, for 20 MHz, the channel 806 may include 9 RUs 816 of 26 tones. For 40 MHz, the channel 806 may include 16-19 RUs 816 of 26 tones with possible 5 direct current (DC) tones. For 40 MHz, the channel 806 may alternatively include 2 RUs 816 of 242 tones with possible 5 DC tones. For 80 MHz, the channel 806 may include 32 or more RUs 816 of 26 tones. For 80 MHz, the channel 806 may alternatively include 4 RUs 816 of 242 tones. For 80 MHz, the channel 806 may also alternatively include 2 RUs 816 of 484 tones.

The resource allocation 860 shows RUs 832, 838 and RUs 834, 836 that have different sizes. A size of the RU 832/838 may be a function of the bandwidth. The RU 832/838 may use an existing numerology (e.g., 26, 56, 114, 242, or 484 tones) in accordance with IEEE 802.11 standards. Further, in this example, a size of the RU 834/836 may be a paired 7 tones regardless of the size of the bandwidth. The paired 7 tones may be equivalent to the size of 14/13 tones.

In an aspect, the present disclosure discloses techniques of allocating bandwidth resources to create a center RU located around DC tones of the bandwidth. Tones that are not used after performing a standard resource allocation may be located in the center RU. The center RU tones may be used for various purposes. For example, the center RU tones may be used for a control channel in the downlink. Moreover, the center RU tones may be used by a first/last OFDMA user in the uplink or downlink.

In another aspect, for each bandwidth, an RU may be the building block of all resource allocations except the center RU. In certain configurations, the RU may use an existing RU size (resource granularity) numerology (e.g., 26, 56, 114, 242, or 484 tones). The center RU may have a fixed location at the center of a packet bandwidth. The center RU may include a number of tones (center RU tones). A half of the center RU tones are located at one end of a group of DC tones and another half of the center RU tones are allocated at the other end of the group of DC tones in the bandwidth. In particular, the center RU may be located between a DC tone and a tone of the RU. The size of the center RU may scale with the size of the bandwidth. The wireless device 804 may adjust a number of DC tones (located at a central portion of the bandwidth and a number of guard tones (located at outer edge portions of the bandwidth) in order to fit the center RU into a combination of resource allocations with known tone plans. As shown in the Figures, the guard tones may be referred to as left guard tones and right guard tones. However, the guard tones located at outer edge portions of the bandwidth may also be referred to as upper guard tones and lower guard tones.

In another aspect, there may be one fixed RU size for each bandwidth. Alternatively, the RU size may vary. A scheduler may be allowed to select the RU size for each bandwidth. The scheduler may indicate the RU size via 1 or 2 bits in a SIG field. Accordingly, the size of the center RU may be a function of both the size of the bandwidth and the size of the RU.

The techniques of the present disclosure may provide a number of advantages. For example, the center RU may be used as a control channel in the downlink, or used by a first/last OFDMA user in the uplink or downlink based on the signaling. Another advantage may be that the center RU allocation may not need to be signaled to a station. The station may determine the center RU allocation via other information already signaled to the station. A further advantage is that, a MAC layer may not need to locate and pack small packets to fill unused resources, and more resource allocation types are supported.

In yet another aspect, the center RU as described supra and infra may be replaced by two edge RUs having a same total block size as the center RU. The two edge RUs may be located at left and right edges of the bandwidth between a guard tone and a first RU. The two edge RUs may be assigned together to increase diversity.

Figure 9:
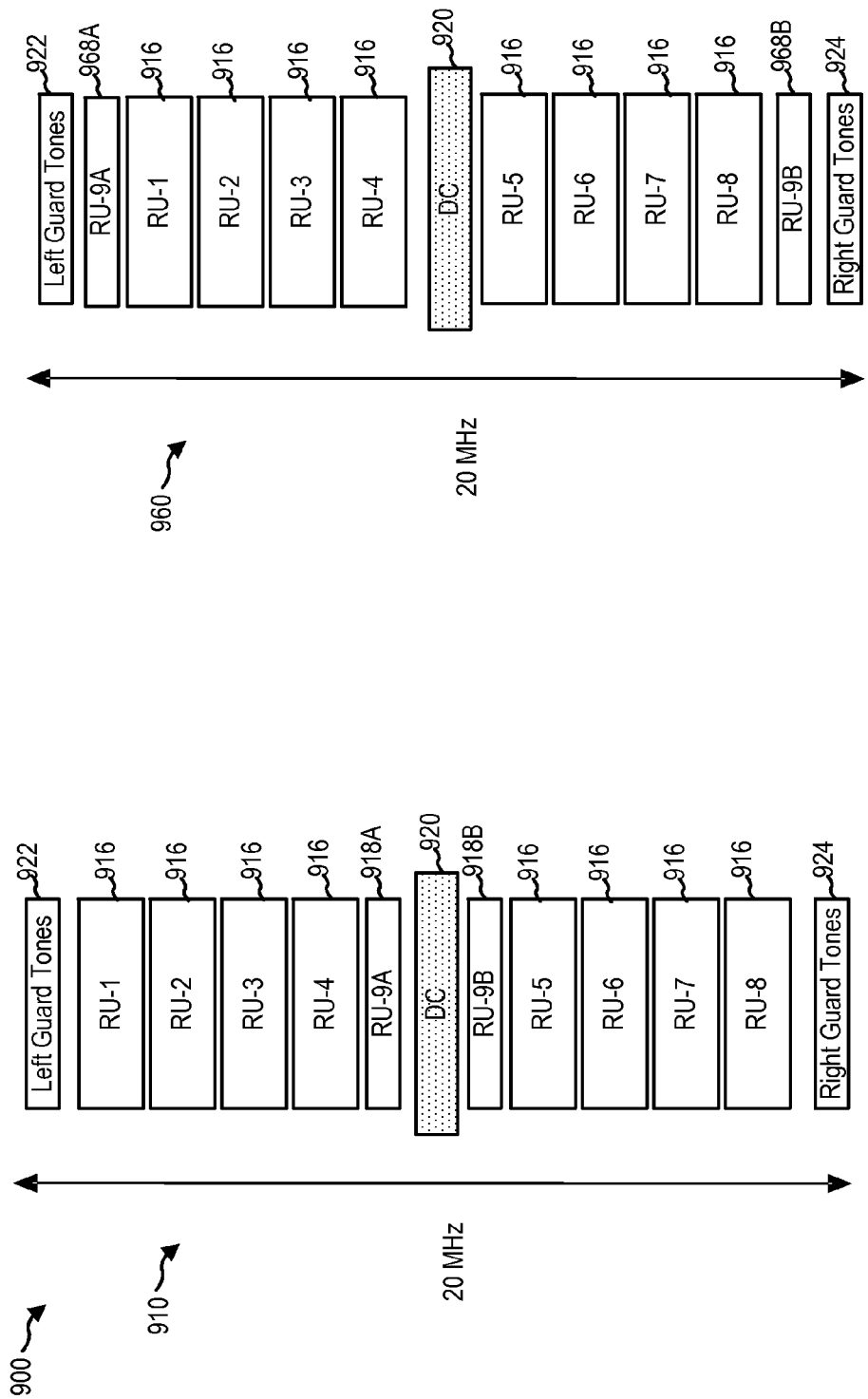
FIG. 9 is a diagram illustrating a first exemplary resource allocation on a channel of a 20 MHz bandwidth in a WLAN.

FIG. 9 is a diagram 900 illustrating a first exemplary resource allocation on a channel 806 of a 20 MHz bandwidth in a WLAN. In resource allocation 910, a 20 MHz bandwidth may be used having 256 tones. In the resource allocations depicted in FIG. 9 (as well as the resource allocations shown in FIGS. 10-20), frequency values increase from an upper portion of the bandwidth to a lower portion of the bandwidth (e.g., from left guard tones 922 to right guard tones 924, which will be described infra). In this example, the 20 MHz bandwidth may include 9 RUs (e.g., RU-1 to RU-8 916 and RU-9 918) that are used for communicating data. As an example, each of the RUs 916 may have 26 tones. Further, the 26 tones may include 24 data tones and 2 pilot tones. The 20 MHz bandwidth may include the left guard tones 922 at the lower end of the frequency and the right guard tones 924 at the higher end of the frequency. The left guard tones 922 and the right guard tones 924 may include a predetermined number of, e.g., 11, guard tones. Further, the 20 MHz bandwidth may include a number of DC tones 920 at the center of the 20 MHz bandwidth. As an example, the number of DC tones 920 may be determined to be 11. The RU-9 918 may be split into two parts, e.g., a center RU-part-9A 918A and a center RU-part-9B 918B, one of which is below the DC tones 920 in frequency and the other is above the DC tones 920 in frequency. Each of the center RU-part-9A 918A and the center RU-part-9B 918B may include 13 tones.

In resource allocation 960, comparing with resource allocation 910, the center RU-part-9A 918A and the center RU-part-9B 918B are replaced by an edge RU-part-9A 968A and an edge RU-part-9B 968B. For example, the RU-9 968 is split into the edge RU-part-9A 968A and the edge RU-part-9B 968B, one of which is placed adjacent to the left guard tones 922 and the other is placed adjacent to the right guard tones 924. The edge RU-part-9A 968A is above the left guard tones 922 in frequency and the edge RU-part-9B 968B is below the right guard tones 924 in frequency. In certain configurations, the edge RUs-parts-9A/9B 968A, 968B may not be used to communicate data and may be used as additional guard tones.

Example resource allocations may be as follows. For one user, the user may use a 242-tone resource granularity numerology (e.g., 234 data tones and 8 pilot tones) or the user may be allocated all the RUs of the 20 MHz bandwidth (e.g., the RU-1 to RU-8 916 and the RU-9 918). For two users, a first user may be allocated the RU-1 to RU-8 916 (e.g., 8 RUs) and a second user may be allocated the center RUs-parts-9A/9B 918A, 918B or the edge RUs-parts-9A/9B 968A, 968B. For three users, a first user may be allocated 4 RUs 916, a second user may be allocated 4 RUs 916, and a third user may be allocated the center RUs-parts-9A/9B 918A, 918B or the edge RUs-parts-9A/9B 968A, 968B. Various other combinations are possible. Notably, the center RUs-parts-9A/9B 918A, 918B or the edge RUs-parts-9A/9B 968A, 968B collectively may have a size of 26 tones, and the 26 tones may include 24 data tones and 2 pilot tones.

Figure 10:
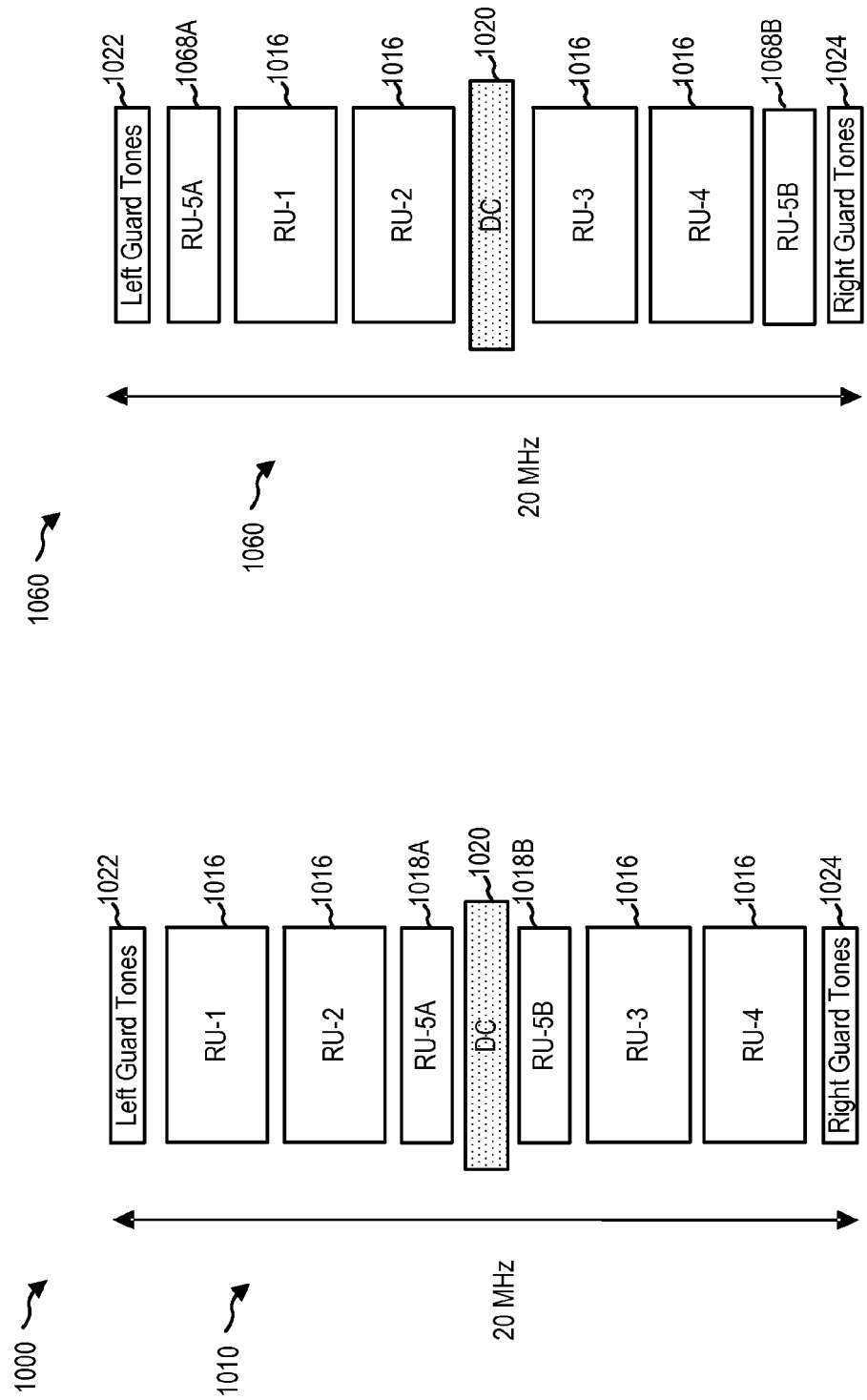
FIG. 10 is a diagram illustrating a second exemplary resource allocation on a channel of a 20 MHz bandwidth in a WLAN.

FIG. 10 is a diagram 1000 illustrating a second exemplary resource allocation on a channel 806 of a 20 MHz bandwidth in a WLAN. In resource allocation 1010, a 20 MHz bandwidth may be used having 256 tones. In this example, the 20 MHz bandwidth may include 5 RUs (e.g., RU-1 to RU-4 1016 and RU-5 1018) that are used for communicating data. As an example, each of the RU-1 to RU-4 1016 may have 56 tones. The 20 MHz bandwidth may include the left guard tones 1022 at the lower end of the frequency and the right guard tones 1024 at the higher end of the frequency. The left guard tones 1022 and the right guard tones 1024 may include a predetermined number of, e.g., 11, guard tones. Further, the 20 MHz bandwidth may include a number of DC tones 1020 at the center of the 20 MHz bandwidth. As an example, the number of DC tones 1020 may be determined to be 7. The RU-5 1018 may be split into two parts, e.g., a center RU-part-5A 1018A and a center RU-part-5B 1018B, one of which is below the DC tones 1020 and the other is above the DC tones 1020. Each of the center RU-part-5A 1018A and the center RU-part-5B 1018B may include 7 tones.

In resource allocation 1060, comparing with resource allocation 1010, the center RU-part-5A 1018A and the center RU-part-5B 1018B are replaced by an edge RU-part-5A 1068A and an edge RU-part-5B 1068B. For example, the RU-5 1068 is split into the edge RU-part-5A 1068A and the edge RU-part-5B 1068B, one of which is placed adjacent to the left guard tones 1022 and the other is placed adjacent to the right guard tones 1024. The edge RU-part-5A 1068A is above the left guard tones 1022 in frequency and the edge RU-part-5B 1068B is below the right guard tones 1024 in frequency. In certain configurations, the edge RU-parts-5A/5B 1068A, 1068B may not be used to communicate data and may be used as additional guard tones.

Example resource allocations may be as follows. For one user, the user may use a 242-tone resource granularity numerology (e.g., 234 data tones and 8 pilot tones) or the user may be allocated all the RUs of the 20 MHz bandwidth (e.g., the RU-1 to RU-4 1016 and the RU-5 1018). For two users, a first user may be allocated the RU-1 to RU-4 1016 (e.g., 4 RUs) and a second user may be allocated the center RU-parts-5A/5B 1018A, 1018B or the edge RU-parts-5A/5B 1068A, 1068B. For three users, a first user may be allocated 2 RUs 1016, a second user may be allocated 2 RUs 1016, and a third user may be allocated the center RU-parts-5A/5B 1018A, 1018B or the edge RU-parts-5A/5B 1068A, 1068B. Various other combinations are possible. Notably, the center RU-parts-5A/5B 1018A, 1018B or the edge RU-parts-5A/5B 1068A, 1068B collectively may have a size of 14 tones, and the 14 tones may include 12 data tones and 2 pilot tones.

Figure 11:
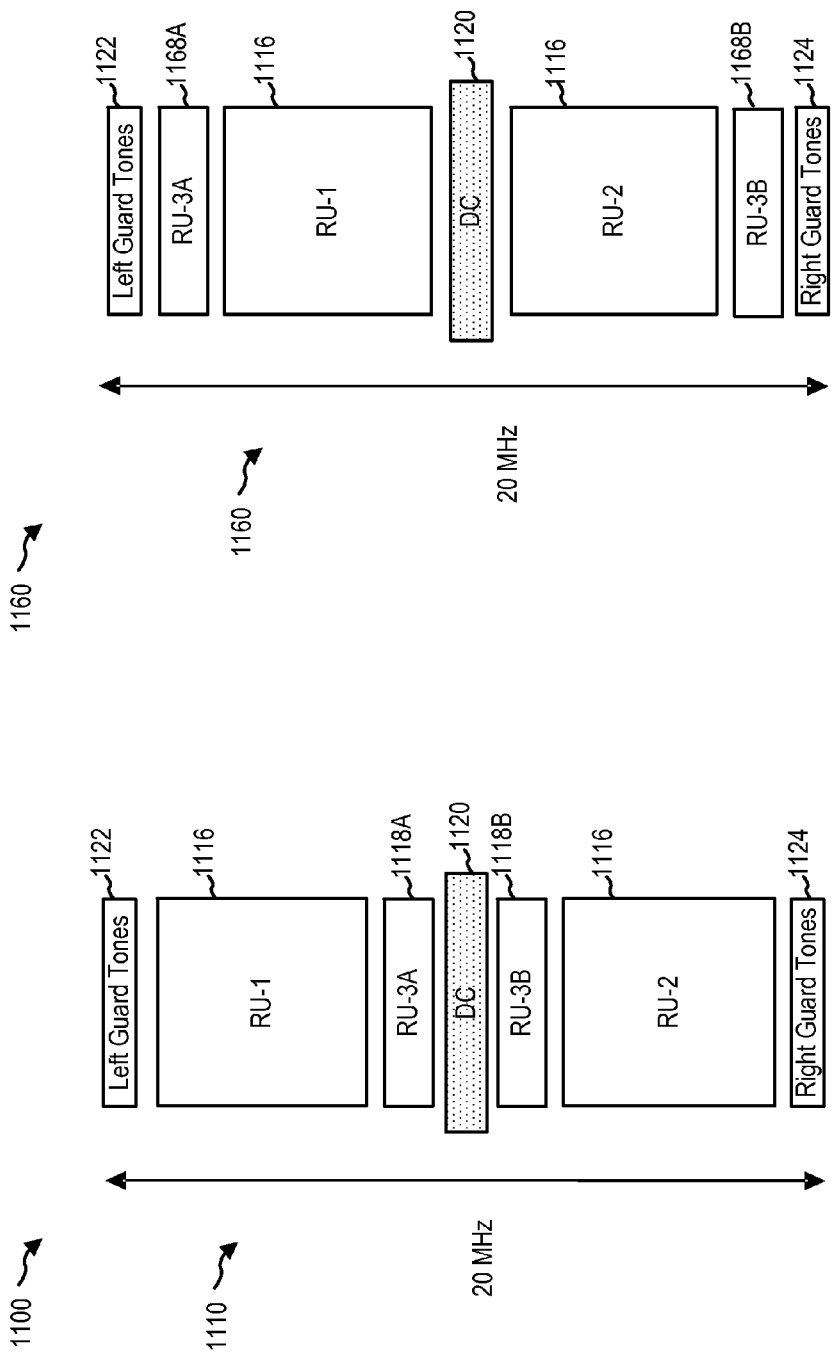
FIG. 11 is a diagram illustrating a third exemplary resource allocation on a channel of a 20 MHz bandwidth in a WLAN.

FIG. 11 is a diagram 1100 illustrating a third exemplary resource allocation on a channel 806 of a 20 MHz bandwidth in a WLAN. In resource allocation 1110, a 20 MHz bandwidth may be used having 256 tones. In this example, the 20 MHz bandwidth may include 3 RUs (e.g., RU-1 to RU-2 1116 and RU-3 1118) that are used for communicating data. As an example, each of the RU-1 to RU-2 1116 may have 114 tones. The 20 MHz bandwidth may include the left guard tones 1122 at the lower end of the frequency and the right guard tones 1124 at the higher end of the frequency. The left guard tones 1122 and the right guard tones 1124 may include a predetermined number of, e.g., 11 or 9, guard tones. Further, the 20 MHz bandwidth may include a number of DC tones 1120 at the center of the 20 MHz bandwidth. As an example, the number of DC tones 1120 may be determined to be 3 or 5. The RU-3 1118 may be split into two parts, e.g., a center RU-part-3A 1118A and a center RU-part-3B 1118B, one of which is below the DC tones 1120 and the other is above the DC tones 1120. Each of the center RU-part-3A 1118A and the center RU-part-3B 1118B may include 7 tones.

In resource allocation 1160, comparing with resource allocation 1110, the center RU-part-3A 1118A and the center RU-part-3B 1118B are replaced by an edge RU-part-3A 1168A and an edge RU-part-3B 1168B. For example, the RU-3 1168 is split into the edge RU-part-3A 1168A and the edge RU-part-3B 1168B, one of which is placed adjacent to the left guard tones 1122 and the other is placed adjacent to the right guard tones 1124. The edge RU-part-3A 1168A is above the left guard tones 1122 in frequency and the edge RU-part-3B 1168B is below the right guard tones 1124 in frequency. In certain configurations, the edge RU-parts-3A/3B 1168A, 1168B may not be used to communicate data and may be used as additional guard tones.

Example resource allocations may be as follows. For one user, the user may use a 242-tone resource granularity numerology (e.g., 234 data tones and 8 pilot tones) or the user may be allocated all the RUs of the 20 MHz bandwidth (e.g., the RU-1 to RU-2 1116 and the RU-3 1118). For two users, a first user may be allocated the RU-1 to RU-2 1116 (e.g., 2 RUs) and a second user may be allocated the center RU-parts-3A/3B 1118A, 1118B or the edge RU-parts-3A/3B 1168A, 1168B. For three users, a first user may be allocated 1 RU 1116, a second user may be allocated 1 RU 1116, and a third user may be allocated the center RU-parts-3A/3B 1118A, 1118B or the edge RU-parts-3A/3B 1168A, 1168B. Notably, the center RU-parts-3A/3B 1118A, 1118B or the edge RU-parts-3A/3B 1168A, 1168B collectively may have a size of 14 tones, and the 14 tones may include 12 data tones and 2 pilot tones.

Figure 12:
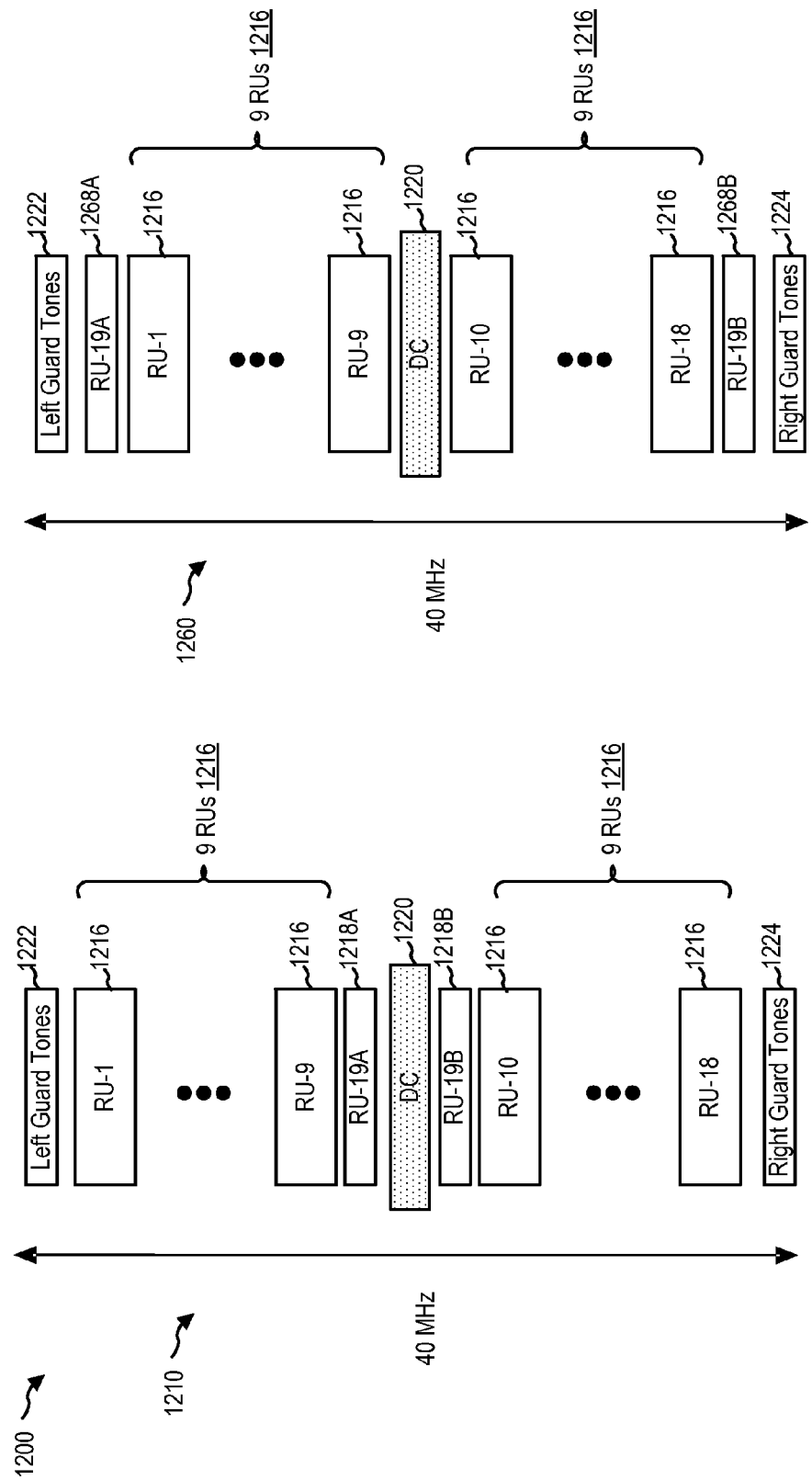
FIG. 12 is a diagram illustrating a first exemplary resource allocation on a channel of a 40 MHz bandwidth in a WLAN.

FIG. 12 is a diagram 1200 illustrating a first exemplary resource allocation on a channel 806 of a 40 MHz bandwidth in a WLAN. In resource allocation 1210, a 40 MHz bandwidth may be used having 512 tones. In this example, the 40 MHz bandwidth may include 16-19 RUs of 26 tones that are used for communicating data. As an example, FIG. 12 shows 19 RUs (e.g., RU-1 to RU-18 1216 and RU-19 1218). Each of the RU-1 to RU-18 1216 may have 26 tones. Further, the 26 tones may include 24 data tones and 2 pilot tones. The 40 MHz bandwidth may together include the left guard tones 1222 at the lower end of the frequency and the right guard tones 1224 at the higher end of the frequency. The left guard tones 1222 and the right guard tones 1224 may include a predetermined number of, e.g., 11, guard tones. Further, the 40 MHz bandwidth may include a number of DC tones 1220 at the center of the 40 MHz bandwidth. As an example, the number of DC tones 1220 may be determined to be 5 (or 7). The RU-19 1218 may be split into two parts, e.g., a center RU-part-19A 1218A and a center RU-part-19B 1218B, one of which is below the DC tones 1220 and the other is above the DC tones 1220. Each of the center RU-part-19A 1218A and the center RU-part-19B 1218B may include 13 tones.

In resource allocation 1260, comparing with resource allocation 1210, the center RU-part-19A 1218A and the center RU-part-19B 1218B are replaced by an edge RU-part-19A 1268A and an edge RU-part-19B 1268B. For example, the RU-19 1268 is split into the edge RU-part-19A 1268A and the edge RU-part-19B 1268B, one of which is placed adjacent to the left guard tones 1222 and the other is placed adjacent to the right guard tones 1224. The edge RU-part-19A 1268A is above the left guard tones 1222 in frequency and the edge RU-part-19B 1268B is below the right guard tones 1224 in frequency. In certain configurations, the edge RU-parts-19A/19B 1268A, 1268B may not be used to communicate data and may be used as additional guard tones.

Example resource allocations may be as follows. For one user, the user may use a 484-tone resource granularity numerology (e.g., 468 data tones and 16 pilot tones) or the user may be allocated all the RUs of the 40 MHz bandwidth (e.g., the RU-1 to RU-18 1216 and the RU-19 1218). For two users, a first user may be allocated the RU-1 to RU-18 1216 (e.g., 18 RUs) and a second user may be allocated the center RU-parts-19A/19B 1218A, 1218B or the edge RU-parts-19A/19B 1268A, 1268B (e.g., 1 RU). For three users, a first user may be allocated 9 RUs 1216, a second user may be allocated 9 RUs 1216, and a third user may be allocated the center RU-parts-19A/19B 1218A, 1218B or the edge RU-parts-19A/19B 1268A, 1268B. Notably, the center RU-parts-19A/19B 1218A, 1218B or the edge RU-parts-19A/19B 1268A, 1268B collectively may have a size of 26 tones, and the 26 tones may include 24 data tones and 2 pilot tones.

In another configuration, the center RU-parts-19A/19B 1218A, 1218B (or the edge RU-parts-19A/19B 1268A, 1268B) may be expanded to include the tones of the RU-9 1216 and the RU-10 1216, respectively. In other words, the RU-19 1216 and the RU-10 1216 may be removed, and the RU-19 1218 may have 78 tones.

Figure 13:
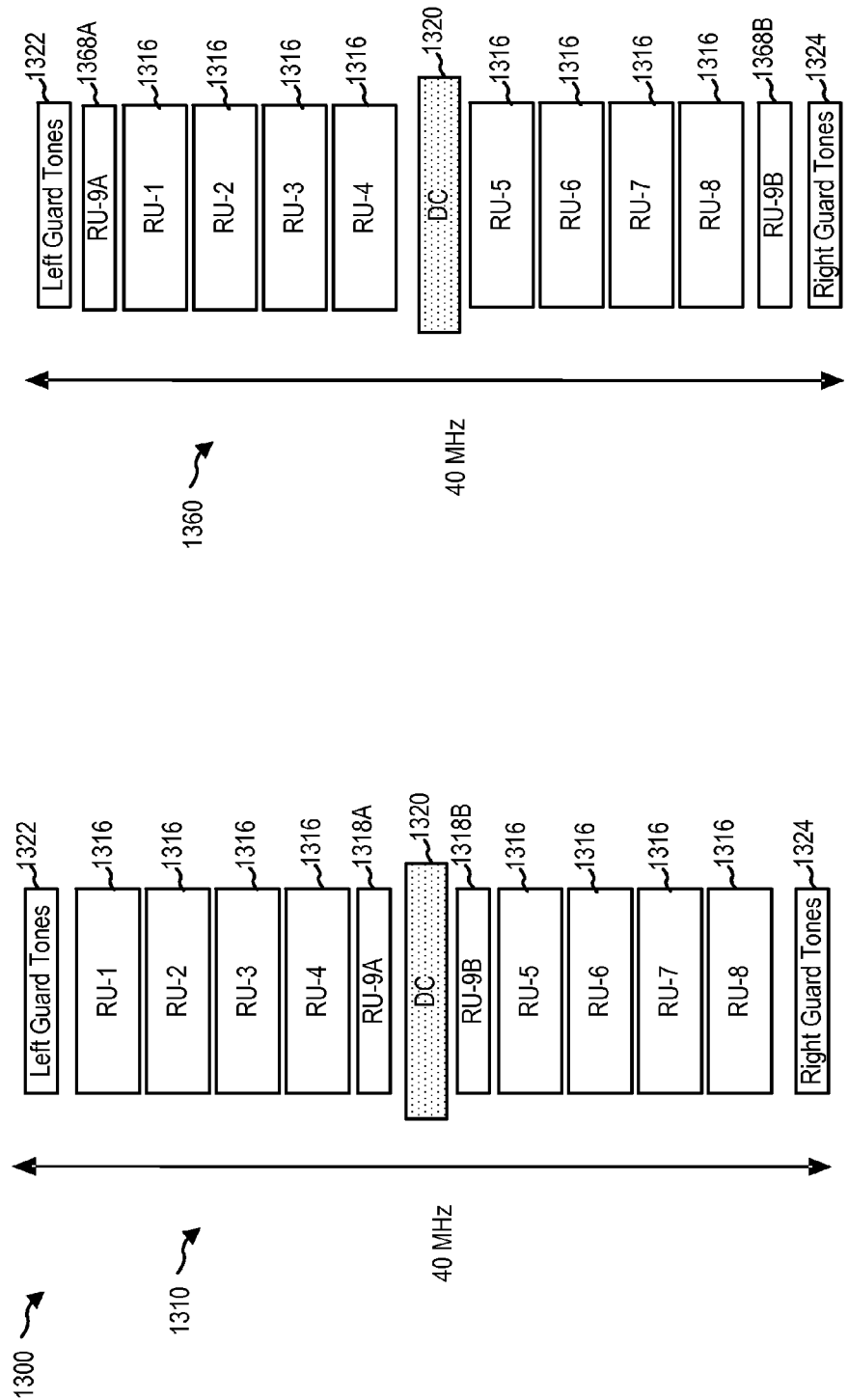
FIG. 13 is a diagram illustrating a second exemplary resource allocation on a channel of a 40 MHz bandwidth in a WLAN.

FIG. 13 is a diagram 1300 illustrating a second exemplary resource allocation on a channel 806 of a 40 MHz bandwidth in a WLAN. In resource allocation 1310, a 40 MHz bandwidth may be used having 512 tones. In this example, the 40 MHz bandwidth may include 9 RUs (e.g., RU-1 to RU-8 1316 and RU-9 1318) that are used for communicating data. As an example, each of the RUs 1316 may have 56 tones. The 40 MHz bandwidth may include the left guard tones 1322 at the lower end of the frequency and the right guard tones 1324 at the higher end of the frequency. The left guard tones 1322 and the right guard tones 1324 together may include a predetermined number of, e.g., 11, guard tones. Further, the 40 MHz bandwidth may include a number of DC tones 1320 at the center of the 40 MHz bandwidth. As an example, the number of DC tones 1320 may be determined to be 11. The RU-9 1318 may be split into two parts, e.g., a center RU-part-9A 1318A and a center RU-part-9B 1318B, one of which is below the DC tones 1320 in frequency and the other is above the DC tones 1320 in frequency. Each of the center RU-part-9A 1318A and the center RU-part-9B 1318B may include 21 tones.

In resource allocation 1360, comparing with resource allocation 1310, the center RU-part-9A 1318A and the center RU-part-9B 1318B are replaced by an edge RU-part-9A 1368A and an edge RU-part-9B 1368B. For example, the RU-9 1368 is split into the edge RU-part-9A 1368A and the edge RU-part-9B 1368B, one of which is placed adjacent to the left guard tones 1322 and the other is placed adjacent to the right guard tones 1324. The edge RU-part-9A 1368A is above the left guard tones 1322 in frequency and the edge RU-part-9B 1368B is below the right guard tones 1324 in frequency. In certain configurations, the edge RUs-9A/9B 1368A, 1368B may not be used to communicate data and may be used as additional guard tones.

Example resource allocations may be as follows. For one user, the user may use a 484-tone resource granularity numerology (e.g., 468 data tones and 16 pilot tones) or the user may be allocated all the RUs of the 40 MHz bandwidth (e.g., the RU-1 to RU-8 1316 and the RU-9 1318). For two users, a first user may be allocated the RU-1 to RU-8 1316 (e.g., 8 RUs) and a second user may be allocated the center RUs-9A/9B 1318A, 1318B or the edge RUs-9A/9B 1368A, 1368B. For three users, a first user may be allocated 4 RUs 1316, a second user may be allocated 4 RUs 1316, and a third user may be allocated the center RUs-9A/9B 1318A, 1318B or the edge RUs-9A/9B 1368A, 1368B. Various other combinations are possible. Notably, the RU-9 1318 having a size of 42 tones may be equivalent to three 14-tone allocations. Each 14-tone allocation may include 12 data tones and 2 pilot tones.

Figure 14:
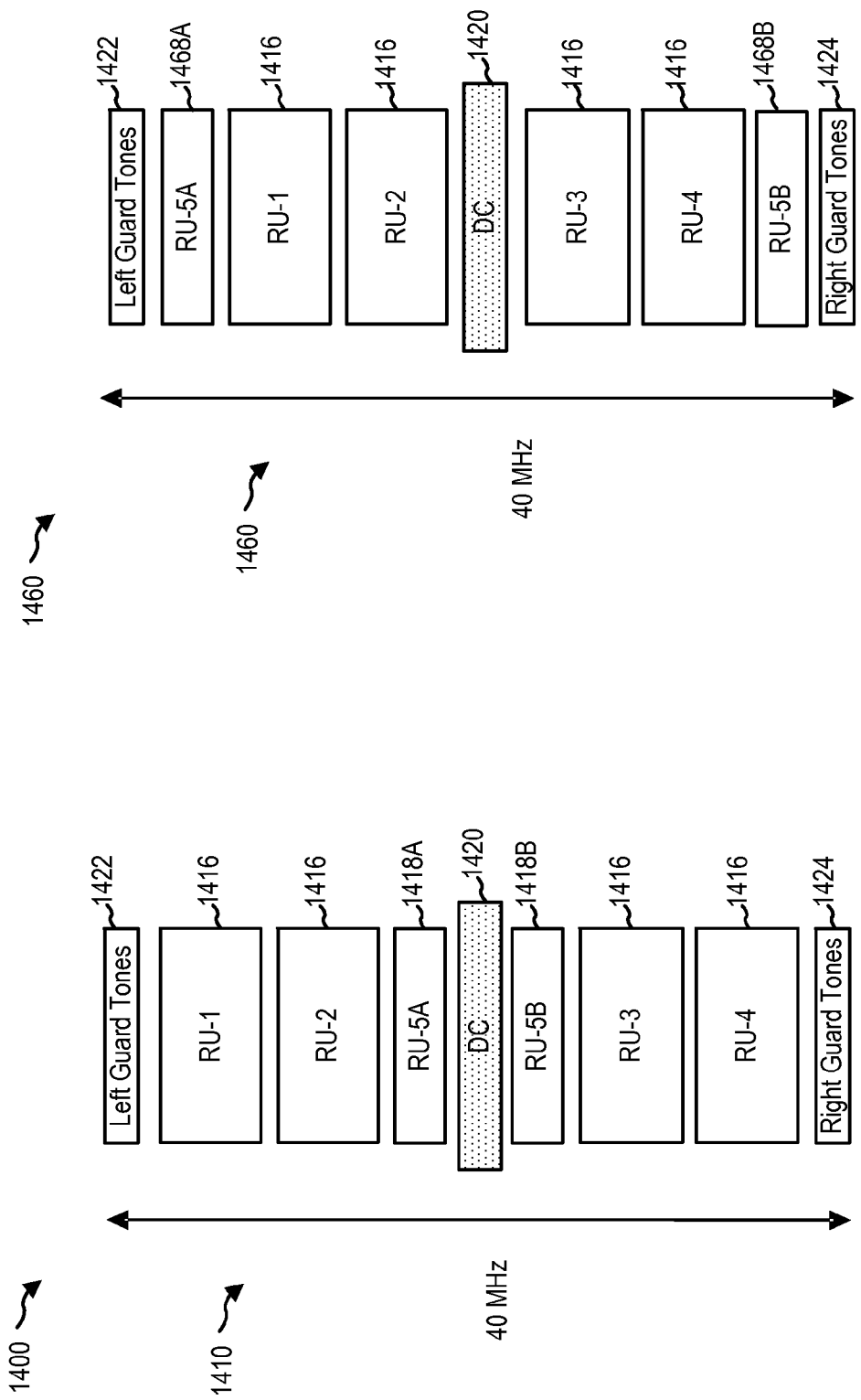
FIG. 14 is a diagram illustrating a third exemplary resource allocation on a channel of a 40 MHz bandwidth in a WLAN.

FIG. 14 is a diagram 1400 illustrating a third exemplary resource allocation on a channel 806 of a 40 MHz bandwidth in a WLAN. In resource allocation 1410, a 40 MHz bandwidth may be used having 512 tones. In this example, the 40 MHz bandwidth may include 5 RUs (e.g., RU-1 to RU-4 1416 and RU-5 1418) that are used for communicating data. As an example, each of the RU-1 to RU-4 1416 may have 114 tones. The 40 MHz bandwidth may include the left guard tones 1422 at the lower end of the frequency and the right guard tones 1424 at the higher end of the frequency. The left guard tones 1422 and the right guard tones 1424 may include a predetermined number of, e.g., 11 or 9, guard tones. Further, the 40 MHz bandwidth may include a number of DC tones 1420 at the center of the 40 MHz bandwidth. As an example, the number of DC tones 1420 may be determined to be 3 or 5. The RU-5 1418 may be split into two parts, e.g., a center RU-part-5A 1418A and a center RU-part-5B 1418B, one of which is below the DC tones 1420 and the other is above the DC tones 1420. Each of the center RU-part-5A 1418A and the center RU-part-5B 1418B may include 21 tones.

In resource allocation 1460, comparing with resource allocation 1410, the center RU-part-5A 1418A and the center RU-part-5B 1418B are replaced by an edge RU-part-5A 1468A and an edge RU-part-5B 1468B. For example, the RU-5 1468 is split into the edge RU-part-5A 1468A and the edge RU-part-5B 1468B, one of which is placed adjacent to the left guard tones 1422 and the other is placed adjacent to the right guard tones 1424. The edge RU-part-5A 1468A is above the left guard tones 1422 in frequency and the edge RU-part-5B 1468B is below the right guard tones 1424 in frequency.

In certain configurations, the edge RU-parts-5A/5B 1468A, 1468B may not be used to communicate data and may be used as additional guard tones.

Example resource allocations may be as follows. For one user, the user may use a 484-tone resource granularity numerology (e.g., 468 data tones and 16 pilot tones) or the user may be allocated all the RUs of the 40 MHz bandwidth (e.g., the RU-1 to RU-4 1416 and the RU-5 1418). For two users, a first user may be allocated the RU-1 to RU-4 1416 (e.g., 4 RUs) and a second user may be allocated the center RU-parts-5A/5B 1418A, 1418B or the edge RU-parts-5A/5B 1468A, 1468B (e.g., 1 RU). For three users, a first user may be allocated 2 RUs 1416, a second user may be allocated 2 RUs 1416, and a third user may be allocated the center RU-parts-5A/5B 1418A, 1418B or the edge RU-parts-5A/5B 1468A, 1468B. Various other combinations are possible. Notably, the RU-5 1418 having a size of 42 tones may be equivalent to three 14-tone allocations. Each 14-tone allocation may include 12 data tones and 2 pilot tones.

Figure 15:
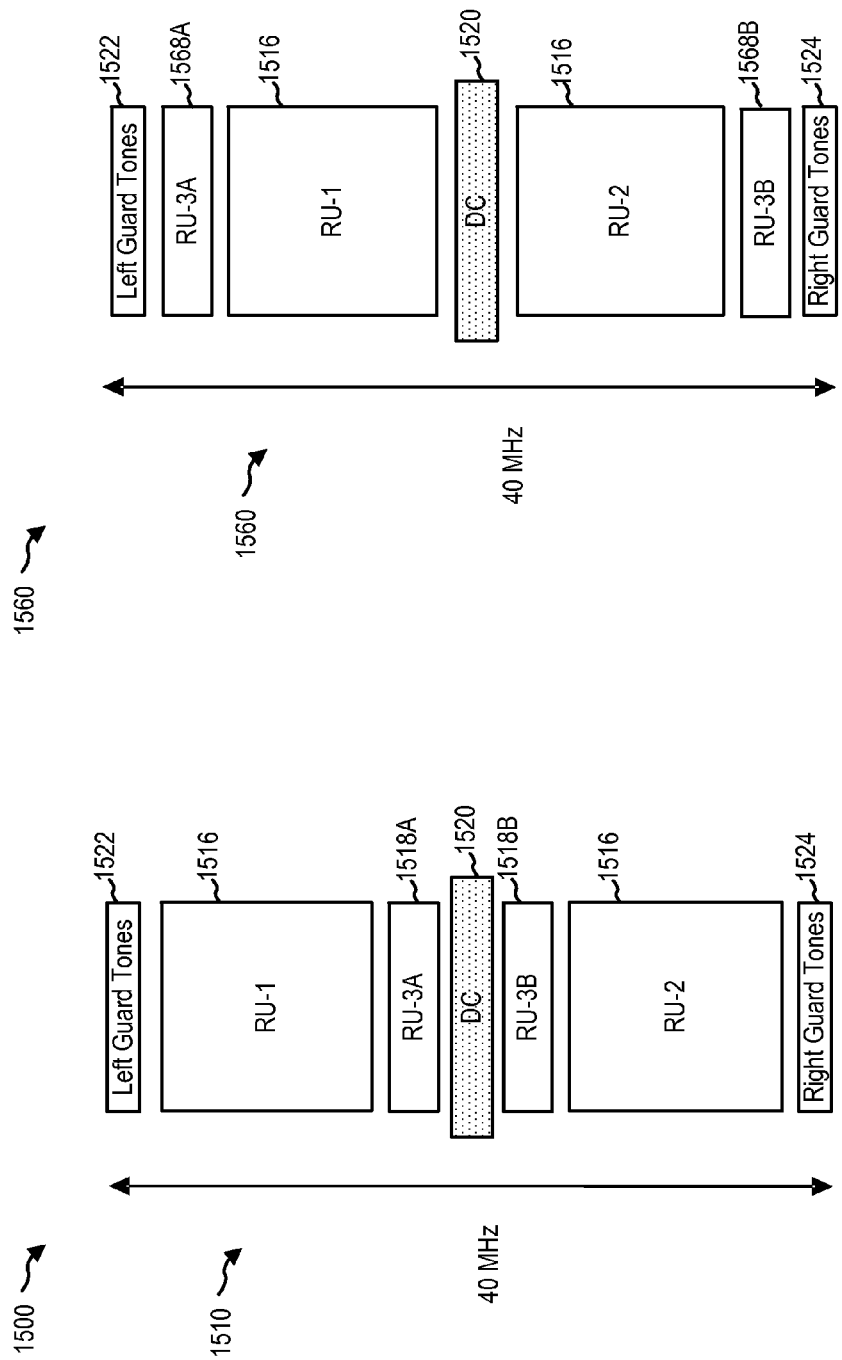
FIG. 15 is a diagram illustrating a fourth exemplary resource allocation on a channel of a 40 MHz bandwidth in a WLAN.

FIG. 15 is a diagram 1500 illustrating a fourth exemplary resource allocation on a channel 806 of a 40 MHz bandwidth in a WLAN. In resource allocation 1510, a 40 MHz bandwidth may be used having 512 tones. In this example, the 40 MHz bandwidth may include 3 RUs (e.g., RU-1 to RU-2 1516 and RU-3 1518) that are used for communicating data.

As an example, each of the RU-1 to RU-2 1516 may have 242 tones. Further, the 242 tones may include 234 data tones and 8 pilot tones. The 40 MHz bandwidth may include the left guard tones 1522 at the lower end of the frequency and the right guard tones 1524 at the higher end of the frequency. The left guard tones 1522 and the right guard tones 1524 may include a predetermined number of, e.g., 11 or 9, guard tones. Further, the 40 MHz bandwidth may include a number of DC tones 1520 at the center of the 40 MHz bandwidth. As an example, the number of DC tones 1520 may be determined to be 3, 5, or more. The RU-3 1518 may be split into two parts, e.g., a center RU-part-3A 1518A and a center RU-part-3B 1518B, one of which is below the DC tones 1520 and the other is above the DC tones 1520. Each of the center RU-part-3A 1518A and the center RU-part-3B 1518B may include 7 tones.

In resource allocation 1560, comparing with resource allocation 1510, the center RU-part-3A 1518A and the center RU-part-3B 1518B are replaced by an edge RU-part-3A 1568A and an edge RU-part-3B 1568B. For example, the RU-3 1568 is split into the edge RU-part-3A 1568A and the edge RU-part-3B 1568B, one of which is placed adjacent to the left guard tones 1522 and the other is placed adjacent to the right guard tones 1524. The edge RU-part-3A 1568A is above the left guard tones 1522 in frequency and the edge RU-part-3B 1568B is below the right guard tones 1524 in frequency. In certain configurations, the edge RU-parts-3A/3B 1568A, 1568B may not be used to communicate data and may be used as additional guard tones.

Example resource allocations may be as follows. For one user, the user may use a 484-tone resource granularity numerology (e.g., 468 data tones and 16 pilot tones) or the user may be allocated all the RUs of the 40 MHz bandwidth (e.g., the RU-1 to RU-2 1516 and the RU-3 1518). For two users, a first user may be allocated the RU-1 to RU-2 1516 (e.g., 2 RUs) and a second user may be allocated the center RU-parts-3A/3B 1518A, 1518B or the edge RU-parts-3A/3B 1568A, 1568B (e.g., 1 RU). For three users, a first user may be allocated 1 RU 1516, a second user may be allocated 1 RU 1516, and a third user may be allocated the center RU-parts-3A/3B 1518A, 1518B or the edge RU-parts-3A/3B 1568A, 1568B. Notably, the center RU-parts-3A/3B 1518A, 1518B or the edge RU-parts-3A/3B 1568A, 1568B collectively may have a size of 14 tones, and the 14 tones may include 12 data tones and 2 pilot tones.

Figure 16:
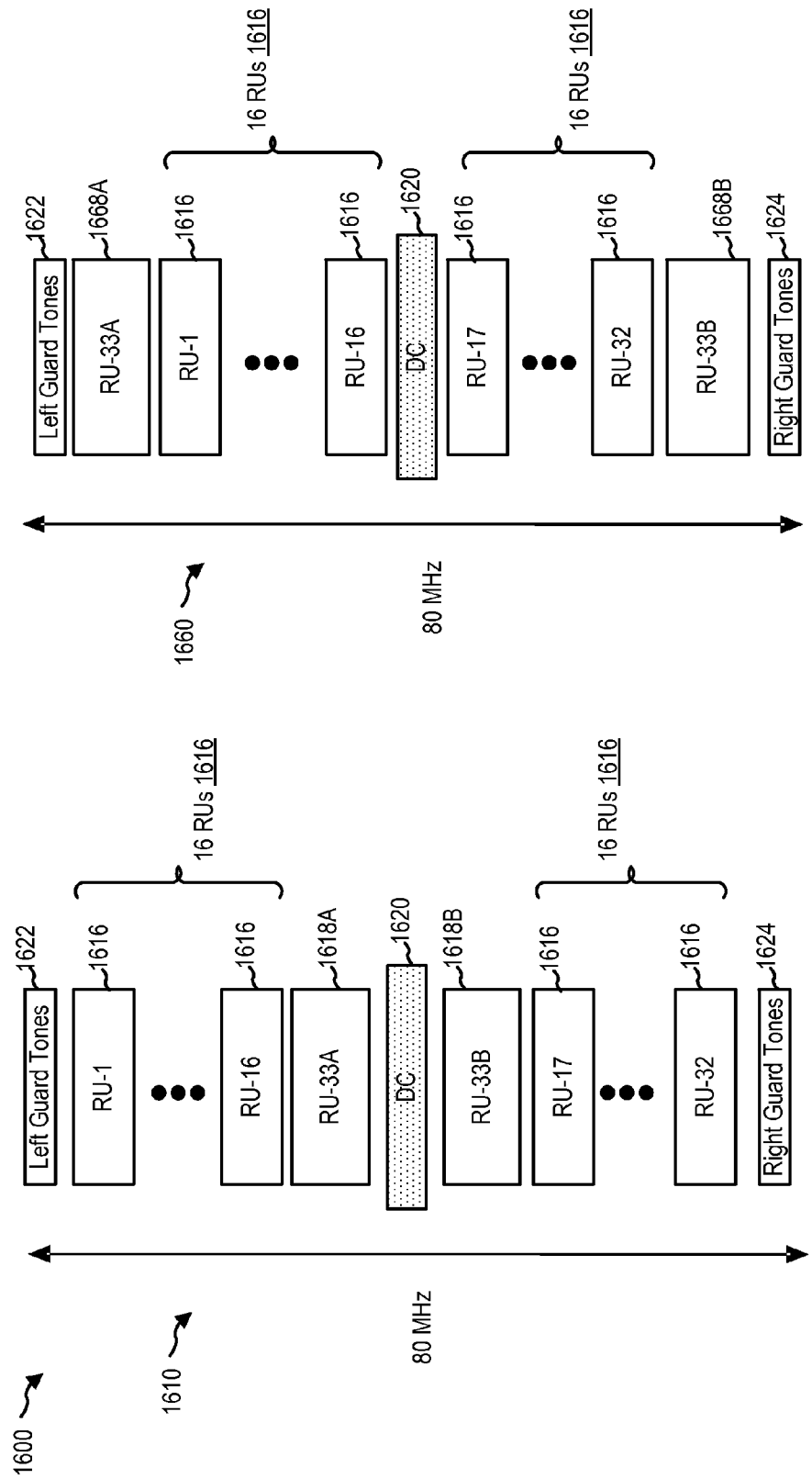
FIG. 16 is a diagram illustrating a first exemplary resource allocation on a channel of an 80 MHz bandwidth in a WLAN.

FIG. 16 is a diagram 1600 illustrating a first exemplary resource allocation on a channel 806 of an 80 MHz bandwidth in a WLAN. In resource allocation 1610, a 80 MHz bandwidth may be used having 1024 tones. In this example, the 80 MHz bandwidth may include 32 or more 26-tone RUs that are used for communicating data. As an example, FIG. 16 shows 33 RUs (e.g., RU-1 to RU-32 1616 and RU-33 1618). Each of the RU-1 to RU-32 1616 may have 26 tones. Further, the 26 tones may include 24 data tones and 2 pilot tones. The 80 MHz bandwidth may together include the left guard tones 1622 at the lower end of the frequency and the right guard tones 1624 at the higher end of the frequency. The left guard tones 1622 and the right guard tones 1624 may include a predetermined number of, e.g., 11, guard tones. Further, the 80 MHz bandwidth may include a number of DC tones 1620 at the center of the 80 MHz bandwidth. As an example, the number of DC tones 1620 may be determined to be 11. The RU-33 1618 may be split into two parts, e.g., a center RU-part-33A 1618A and a center RU-part-33B 1618B, one of which is below the DC tones 1620 and the other is above the DC tones 1620. Each of the center RU-part-33A 1618A and the center RU-part-33B 1618B may include 85 tones.

In resource allocation 1660, comparing with resource allocation 1610, the center RU-part-33A 1618A and the center RU-part-33B 1618B are replaced by an edge RU-part-33A 1668A and an edge RU-part-33B 1668B. For example, the RU-33 1668 is split into the edge RU-part-33A 1668A and the edge RU-part-33B 1668B, one of which is placed adjacent to the left guard tones 1622 and the other is placed adjacent to the right guard tones 1624. The edge RU-part-33A 1668A is above the left guard tones 1622 in frequency and the edge RU-part-33B 1668B is below the right guard tones 1624 in frequency. In certain configurations, the edge RU-parts-33A/33B 1668A, 1668B may not be used to communicate data and may be used as additional guard tones.

Example resource allocations may be as follows. For one user, the user may use a 1024-tone resource granularity numerology or the user may be allocated all the RUs of the 80 MHz bandwidth (e.g., the RU-1 to RU-32 1616 and the RU-33 1618). For two users, a first user may be allocated the RU-1 to RU-32 1616 (e.g., 32 RUs) and a second user may be allocated the center RU-parts-33A/B 1618A, 1618B or the edge RU-parts-33A/33B 1668A, 1668B (e.g., 1 RU). For three users, a first user may be allocated 16 RUs 1616, a second user may be allocated 16 RUs 1616, and a third user may be allocated the center RU-parts-33A/B 1618A, 1618B or the edge RU-parts-33A/33B 1668A, 1668B. Notably, the center RU-parts-33A/B 1618A, 1618B or the edge RU-parts-33A/33B 1668A, 1668B collectively having a size of 170 tones may be equivalent to one 114-tone allocation and one 56-tone allocation. The 114-tone allocation may include 108 data tones and 6 pilot tones. The 56-tone allocation may include 52 data tones and 4 pilot tones.

Figure 17:
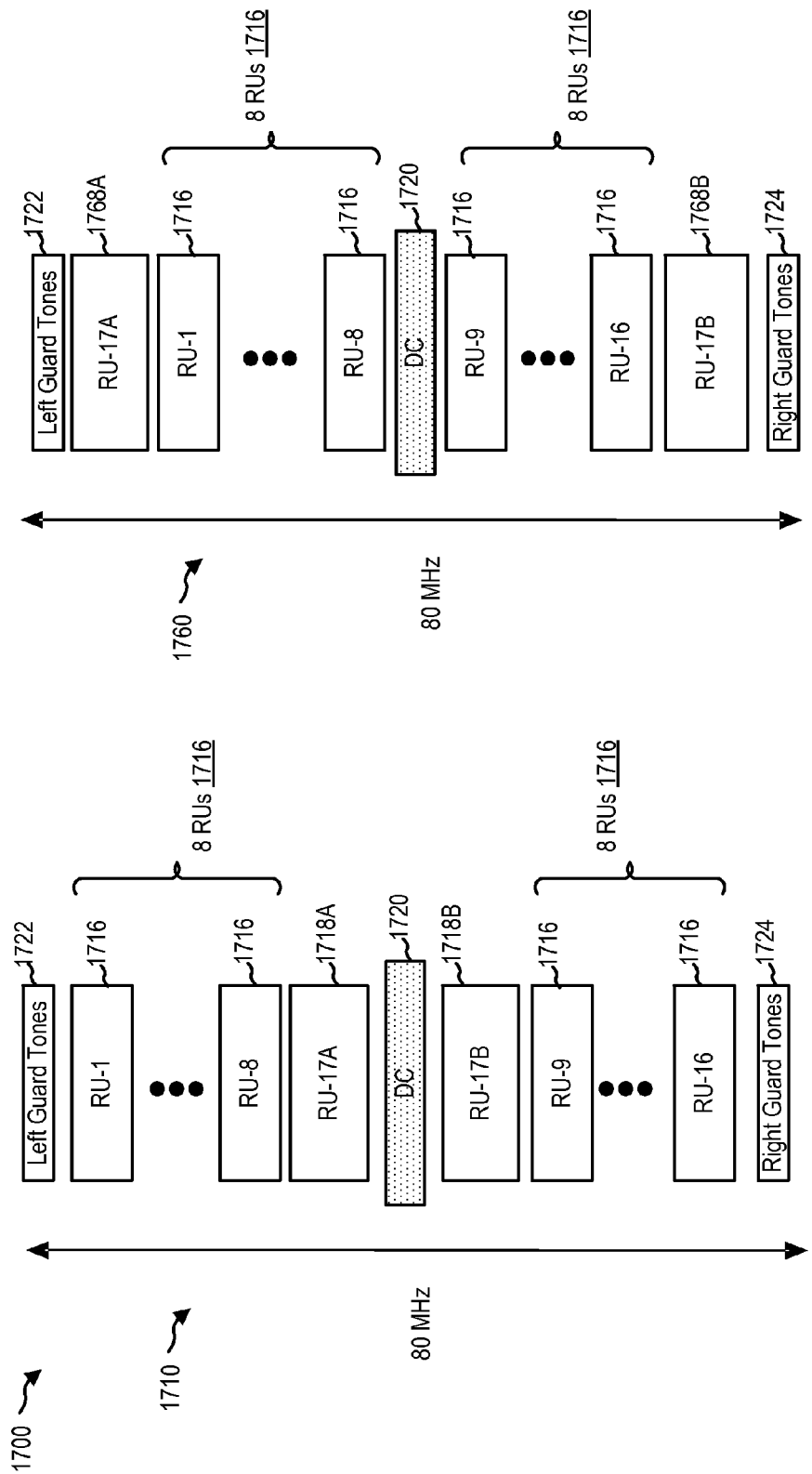
FIG. 17 is a diagram illustrating a second exemplary resource allocation on a channel of an 80 MHz bandwidth in a WLAN.

FIG. 17 is a diagram 1700 illustrating a second exemplary resource allocation on a channel 806 of an 80 MHz bandwidth in a WLAN. In resource allocation 1710, a 80 MHz bandwidth may be used having 1024 tones. In this example, the 80 MHz bandwidth may include 16 or more 56-tone RUs that are used for communicating data. As an example, FIG. 17 shows 17 RUs (e.g., RU-1 to RU-16 1716 and RU-17 1718). Each of the RU-1 to RU-16 1716 may have 56 tones. Further, the 56 tones may include 52 data tones and 4 pilot tones. The 80 MHz bandwidth may together include the left guard tones 1722 at the lower end of the frequency and the right guard tones 1724 at the higher end of the frequency. The left guard tones 1722 and the right guard tones 1724 may include a predetermined number of, e.g., 11, guard tones. Further, the 80 MHz bandwidth may include a number of DC tones 1720 at the center of the 80 MHz bandwidth. As an example, the number of DC tones 1720 may be determined to be 5. The RU-17 1718 may be split into two parts, e.g., a center RU-part-17A 1718A and a center RU-part-17B 1718B, one of which is below the DC tones 1720 and the other is above the DC tones 1720. Each of the center RU-part-17A 1718A and the center RU-part-17B 1718B may include 56 tones.

In resource allocation 1760, comparing with resource allocation 1710, the center RU-part-17A 1718A and the center RU-part-17B 1718B are replaced by an edge RU-part-17A 1768A and an edge RU-part-17B 1768B. For example, the RU-17 1768 is split into the edge RU-part-17A 1768A and the edge RU-part-17B 1768B, one of which is placed adjacent to the left guard tones 1722 and the other is placed adjacent to the right guard tones 1724. The edge RU-part-17A 1768A is above the left guard tones 1722 in frequency and the edge RU-part-17B 1768B is below the right guard tones 1724 in frequency. In certain configurations, the edge RU-parts-17A/17B 1768A, 1768B may not be used to communicate data and may be used as additional guard tones.

Example resource allocations may be as follows. For one user, the user may use a 1024-tone resource granularity numerology or the user may be allocated all the RUs of the 80 MHz bandwidth (e.g., the RU-1 to RU-16 1716 and the RU-17 1718). For two users, a first user may be allocated the RU-1 to RU-16 1716 (e.g., 16 RUs) and a second user may be allocated the center RU-parts-17A/17B 1718A, 1718B or the edge RU-parts-17A/17B 1768A, 1768B (e.g., 1 RU). For three users, a first user may be allocated 8 RUs 1716, a second user may be allocated 8 RUs 1716, and a third user may be allocated the center RU-parts-17A/17B 1718A, 1718B or the edge RU-parts-17A/17B 1768A, 1768B. Notably, the center RU-parts-17A/17B 1718A, 1718B or the edge RU-parts-17A/17B 1768A, 1768B collectively having a size of 112 tones may be equivalent to two 56-tone allocations. A 56-tone allocation may include 52 data tones and 4 pilot tones.

Figure 18:
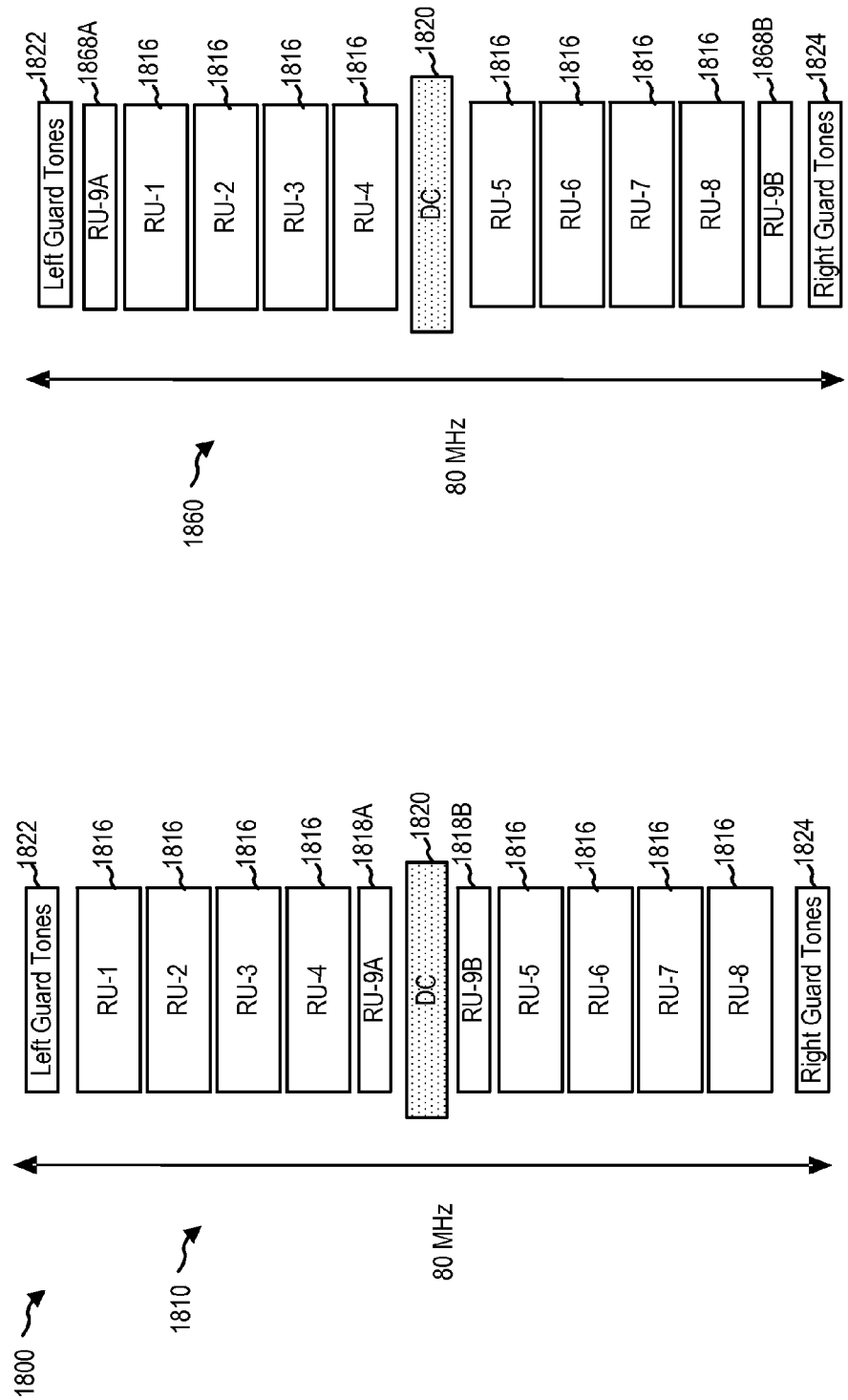
FIG. 18 is a diagram illustrating a third exemplary resource allocation on a channel of an 80 MHz bandwidth in a WLAN.

FIG. 18 is a diagram 1800 illustrating a third exemplary resource allocation on a channel 806 of an 80 MHz bandwidth in a WLAN. In resource allocation 1810, a 80 MHz bandwidth may be used having 1024 tones. In this example, the 80 MHz bandwidth may include 9 RUs (e.g., RU-1 to RU-8 1816 and RU-9 1818) that are used for communicating data. As an example, each of the RUs 1816 may have 114 tones. The 80 MHz bandwidth may include the left guard tones 1822 at the lower end of the frequency and the right guard tones 1824 at the higher end of the frequency. The left guard tones 1822 and the right guard tones 1824 together may include a predetermined number of, e.g., 11, guard tones. Further, the 80 MHz bandwidth may include a number of DC tones 1820 at the center of the 80 MHz bandwidth. As an example, the number of DC tones 1820 may be determined to be 5. The RU-9 1818 may be split into two parts, e.g., a center RU-part-9A 1818A and a center RU-part-9B 1818B, one of which is below the DC tones 1820 in frequency and the other is above the DC tones 1820 in frequency. Each of the center RU-part-9A 1818A and the center RU-part-9B 1818B may include 48 tones.

In resource allocation 1860, comparing with resource allocation 1810, the center RU-part-9A 1818A and the center RU-part-9B 1818B are replaced by an edge RU-part-9A 1868A and an edge RU-part-9B 1868B. For example, the RU-9 1868 is split into the edge RU-part-9A 1868A and the edge RU-part-9B 1868B, one of which is placed adjacent to the left guard tones 1822 and the other is placed adjacent to the right guard tones 1824. The edge RU-part-9A 1868A is above the left guard tones 1822 in frequency and the edge RU-part-9B 1868B is below the right guard tones 1824 in frequency. In certain configurations, the edge RUs-9A/9B 1868A, 1868B may not be used to communicate data and may be used as additional guard tones.

Example resource allocations may be as follows. For one user, the user may use a 1024-tone resource granularity numerology or the user may be allocated all the RUs of the 80 MHz bandwidth (e.g., the RU-1 to RU-8 1816 and the RU-9 1818). For two users, a first user may be allocated the RU-1 to RU-8 1816 (e.g., 8 RUs) and a second user may be allocated the center RUs-9A/9B 1818A, 1818B or the edge RUs-9A/9B 1868A, 1868B (e.g., 1 RU). For three users, a first user may be allocated 4 RUs 1816, a second user may be allocated 4 RUs 1816, and a third user may be allocated the center RUs-9A/9B 1818A, 1818B or the edge RUs-9A/ 9B 1868A, 1868B. Various other combinations are possible. Notably, the RU-9 1818 having a size of 96 tones may be equivalent to one 56-tone allocation, one 26-tone allocation, and one 14-tone allocation. The 56-tone allocation may include 52 data tones and 4 pilot tones. The 26-tone allocation may include 24 data tones and 2 pilot tones. The 14-tone allocation may include 12 data tones and 2 pilot tones.

Figure 19:
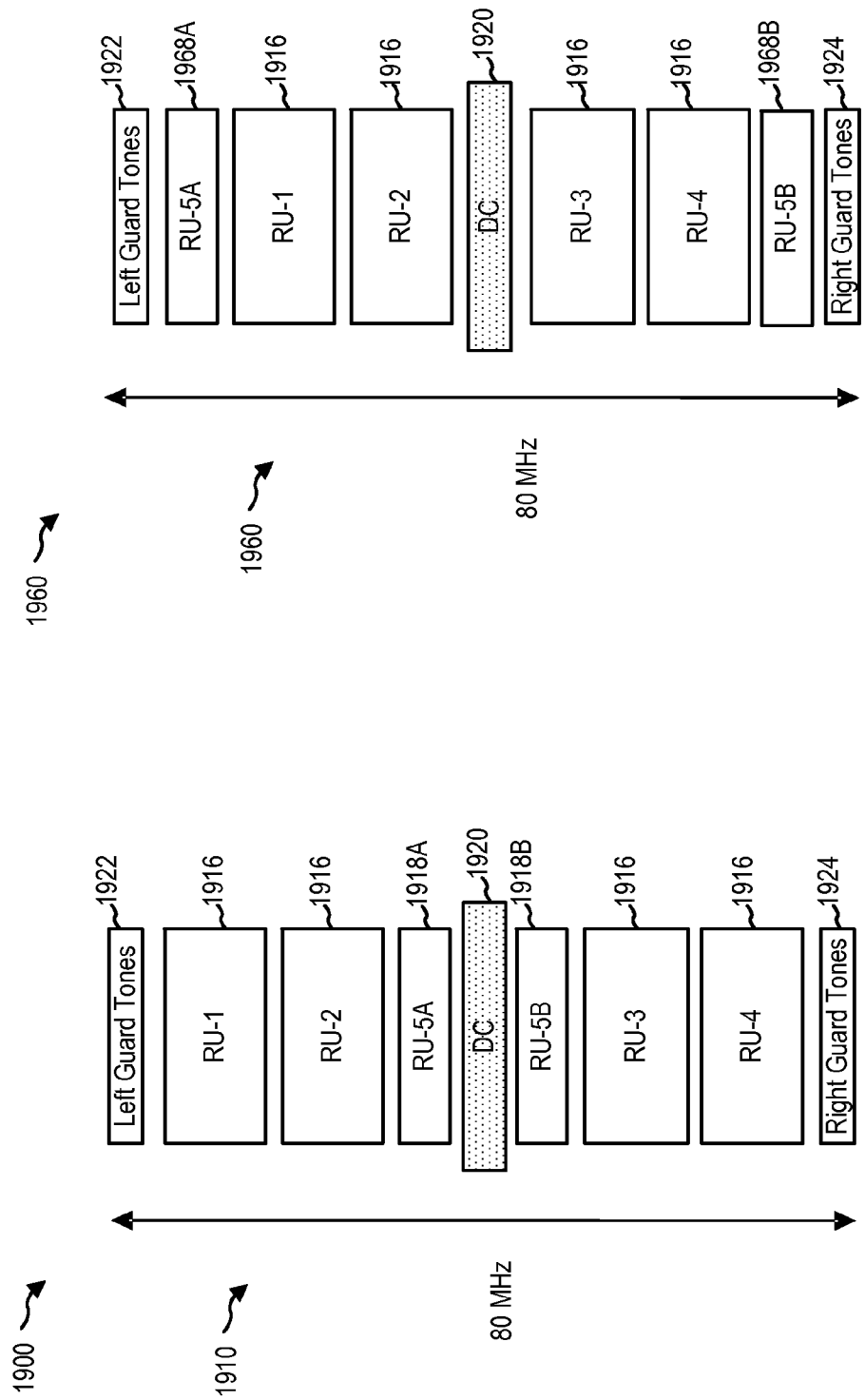
FIG. 19 is a diagram illustrating a fourth exemplary resource allocation on a channel of an 80 MHz bandwidth in a WLAN.

FIG. 19 is a diagram 1900 illustrating a fourth exemplary resource allocation on a channel 806 of an 80 MHz bandwidth in a WLAN. In resource allocation 1910, a 80 MHz bandwidth may be used having 1024 tones. In this example, the 80 MHz bandwidth may include 5 RUs (e.g., RU-1 to RU-4 1916 and RU-5 1918) that are used for communicating data. As an example, each of the RU-1 to RU-4 1916 may have 242 tones. Further, the 242 tones may include 234 data tones and 8 pilot tones. The 80 MHz bandwidth may include the left guard tones 1922 at the lower end of the frequency and the right guard tones 1924 at the higher end of the frequency. The left guard tones 1922 and the right guard tones 1924 may include a predetermined number of, e.g., 11 or 9, guard tones. Further, the 80 MHz bandwidth may include a number of DC tones 1920 at the center of the 80 MHz bandwidth. As an example, the number of DC tones 1920 may be determined to be 3 or 5. The RU-5 1918 may be split into two parts, e.g., a center RU-part-5A 1918A and a center RU-part-5B 1918B, one of which is below the DC tones 1920 and the other is above the DC tones 1920. Each of the center RU-part-5A 1918A and the center RU-part-5B 1918B may include 21 tones.

In resource allocation 1960, comparing with resource allocation 1910, the center RU-part-5A 1918A and the center RU-part-5B 1918B are replaced by an edge RU-part-5A 1968A and an edge RU-part-5B 1968B. For example, the RU-5 1968 is split into the edge RU-part-5A 1968A and the edge RU-part-5B 1968B, one of which is placed adjacent to the left guard tones 1922 and the other is placed adjacent to the right guard tones 1924. The edge RU-part-5A 1968A is above the left guard tones 1922 in frequency and the edge RU-part-5B 1968B is below the right guard tones 1924 in frequency. In certain configurations, the edge RU-parts-5A/ 5B 1968A, 1968B may not be used to communicate data and may be used as additional guard tones.

Example resource allocations may be as follows. For one user, the user may use a 1024-tone resource granularity numerology or the user may be allocated all the RUs of the 80 MHz bandwidth (e.g., the RU-1 to RU-4 1916 and the RU-5 1918). For two users, a first user may be allocated the RU-1 to RU-4 1916 (e.g., 4 RUs) and a second user may be allocated the center RU-parts-5A/5B 1918A, 1918B or the edge RU-parts-5A/5B 1968A, 1968B (e.g., 1 RU). For three users, a first user may be allocated 2 RUs 1916, a second user may be allocated 2 RUs 1916, and a third user may be allocated the center RU-parts-5A/5B 1918A, 1918B or the edge RU-parts-5A/5B 1968A, 1968B. Various other combinations are possible. Notably, the RU-5 1918 having a size of 42 tones may be equivalent to three 14-tone allocations. Each 14-tone allocation may include 12 data tones and 2 pilot tones.

Figure 20:
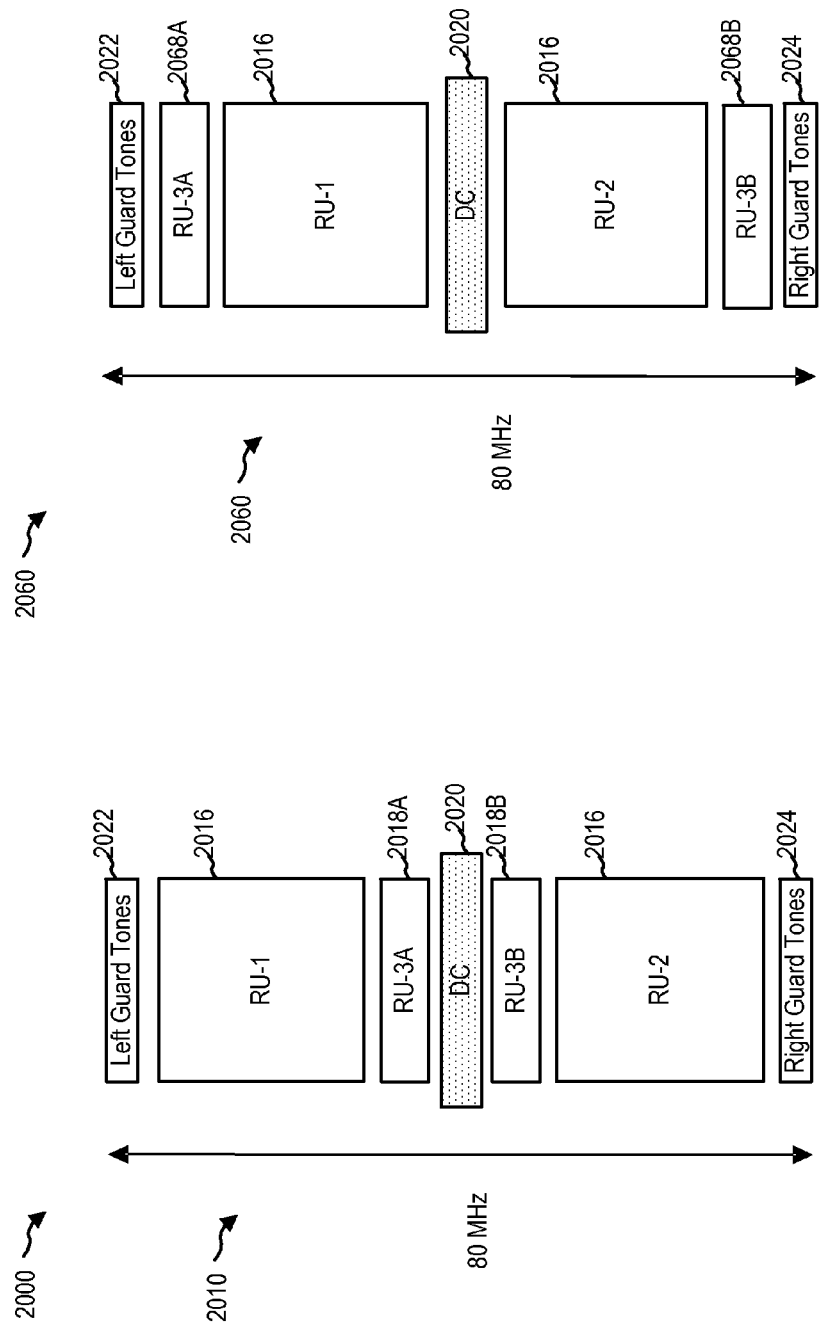
FIG. 20 is a diagram illustrating a fifth exemplary resource allocation on a channel of an 80 MHz bandwidth in a WLAN.

FIG. 20 is a diagram 2000 illustrating a fifth exemplary resource allocation on a channel 806 of an 80 MHz bandwidth in a WLAN. In resource allocation 2010, a 80 MHz bandwidth may be used having 1024 tones. In this example, the 80 MHz bandwidth may include 3 RUs (e.g., RU-1 to RU-2 2016 and RU-3 2018) that are used for communicating data. As an example, each of the RU-1 to RU-2 2016 may have 484 tones. Further, the 484 tones may include 468 data tones and 16 pilot tones. The 80 MHz bandwidth may include the left guard tones 2022 at the lower end of the frequency and the right guard tones 2024 at the higher end of the frequency. The left guard tones 2022 and the right guard tones 2024 may include a predetermined number of, e.g., 11 or 9, guard tones. Further, the 80 MHz bandwidth may include a number of DC tones 2020 at the center of the 80 MHz bandwidth. As an example, the number of DC tones 2020 may be determined to be 3 or 5. The RU-3 2018 may be split into two parts, e.g., a center RU-part-3A 2018A and a center RU-part-3B 2018B, one of which is below the DC tones 2020 and the other is above the DC tones 2020. Each of the center RU-part-3A 2018A and the center RU-part-3B 2018B may include 21 tones or 13 tones.

In resource allocation 2060, comparing with resource allocation 2010, the center RU-part-3A 2018A and the center RU-part-3B 2018B are replaced by an edge RU-part-3A 2068A and an edge RU-part-3B 2068B. For example, the RU-3 2068 is split into the edge RU-part-3A 2068A and the edge RU-part-3B 2068B, one of which is placed adjacent to the left guard tones 2022 and the other is placed adjacent to the right guard tones 2024. The edge RU-part-3A 2068A is above the left guard tones 2022 in frequency and the edge RU-part-3B 2068B is below the right guard tones 2024 in frequency. In certain configurations, the edge RU-parts-3A/3B 2068A, 2068B may not be used to communicate data and may be used as additional guard tones.

Example resource allocations may be as follows. For one user, the user may use a 1024-tone resource granularity numerology or the user may be allocated all the RUs of the 80 MHz bandwidth (e.g., the RU-1 to RU-2 2016 and the RU-3 2018). For two users, a first user may be allocated the RU-1 to RU-2 2016 (e.g., 2 RUs) and a second user may be allocated the center RU-parts-3A/3B 2018A, 2018B or the edge RU-parts-3A/3B 2068A, 2068B (e.g., 1 RU). For three users, a first user may be allocated 1 RU 2016, a second user may be allocated 1 RU 2016, and a third user may be allocated the center RU-parts-3A/3B 2018A, 2018B or the edge RU-parts-3A/3B 2068A, 2068B. Notably, in certain configurations, the center RU-parts-3A/3B 2018A, 2018B or the edge RU-parts-3A/3B 2068A, 2068B collectively may have a size of 42 tones, which may be equivalent to three 14-tone allocations. A 14-tone allocation may include 12 data tones and 2 pilot tones. In certain configurations, the center RU-parts-3A/3B 2018A, 2018B or the edge RU-parts-3A/3B 2068A, 2068B collectively may have a size of 26 tones, and the 26 tones may include 24 data tones and 2 pilot tones.

Figure 21:
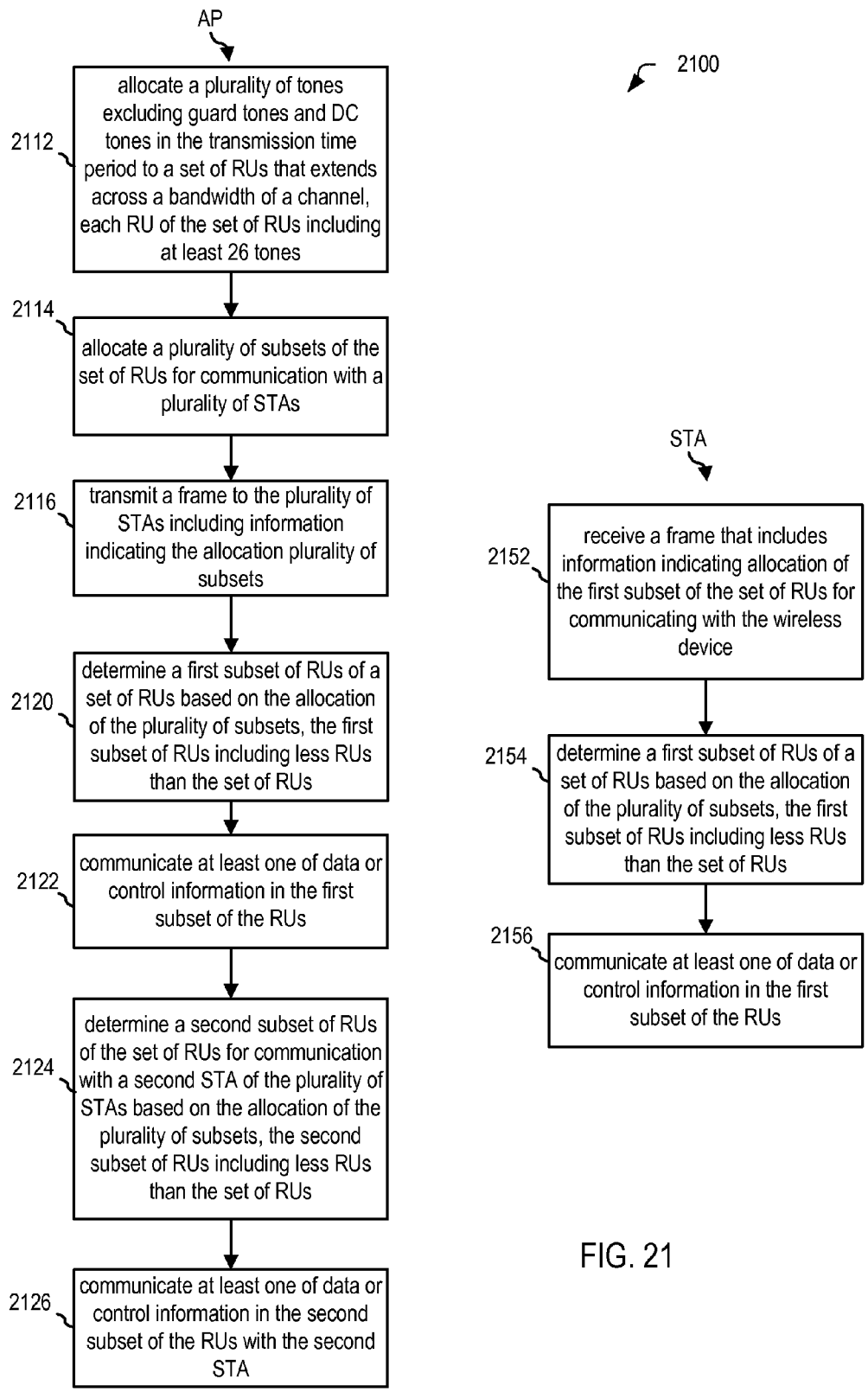
FIG. 21 is a flow chart of an exemplary method of allocating resources of on a channel in a WLAN.

FIG. 21 is a flow chart of an exemplary method 2100 of allocating resources of a bandwidth on a channel in a WLAN. The method may be performed by a wireless device (e.g., the wireless device 804, the wireless device 202/apparatus 2402). The bandwidth may include a plurality of tones. The plurality of tones include a number of guard tones located at outer edge portions of the bandwidth and a number of DC tones located at a central portion of the bandwidth.

In one aspect, the wireless device is an AP. In certain configurations, at operation 2112, the wireless device allocates the plurality of tones excluding the guard tones and the DC tones in a transmission time period to a set of RUs that extends across the bandwidth of the channel. Each RU of the set of RUs includes at least 26 tones. At operation 2114, the wireless device allocates a plurality of subsets of the set of RUs for communication with a plurality of STAs. At operation 2116, the wireless device transmits a frame to the plurality of STAs. The frame includes information indicating the allocation plurality of subsets. At operation 2120, the wireless device determines a first subset of RUs of a set of RUs based on the allocation of the plurality of subsets for communication with a first STA. The first subset of RUs includes less RUs than the set of RUs. At operation 2122, the wireless device communicates at least one of data or control information in the first subset of the RUs with the first STA.

In certain configurations, at operation 2124, the wireless device determines a second subset of RUs of the set of RUs for communication with a second STA of the plurality of STAs based on the allocation of the plurality of subsets. The second subset of RUs includes less RUs than the set of RUs. At operation 2126, the wireless device communicates at least one of data or control information in the second subset of the RUs with the second STA. In certain configurations, the communication with the first STA and the communication with second STA are concurrent.

In another aspect, the wireless device may be a STA. At operation 2152, the wireless device receives a frame that includes information indicating allocation of the first subset of the set of RUs for communicating with the wireless device. The first subset is determined based on the allocation. At operation 2154, the wireless device determines a first subset of RUs of a set of RUs based on the allocation of the plurality of subsets for communication with a first STA. The first subset of RUs includes less RUs than the set of RUs. At operation 2156, the wireless device communicates at least one of data or control information in the first subset of the RUs with the first STA.

For example, referring to FIG. 8, the wireless device 804 divides the channel 806 into K RUs 816. The wireless device 804 communicates data with a particular wireless device 808 using the particular RUs 816 allocated for communicating with the particular wireless device 808.

In certain configurations, the RUs of the set of RUs have a size of at least one of 26, 242, or 484 tones. For example, referring to FIG. 9, the channel 806 includes RUs 916 of 26 tones. Referring to FIG. 15, the channel 806 includes RUs 1516 of 242 tones. Referring to FIG. 20, the channel 806 includes RUs 2016 of 484 tones.

In certain configurations, for each RU of the set of RUs that includes 26 tones, the 26 tones include 24 data tones and 2 pilot tones. For example, referring to FIGS. 9, 12, and 16, the channel 806 includes RUs of 26 tones. In certain configurations, for each RU of the set of RUs that includes 242 tones, the 242 tones include 234 data tones and 8 pilot tones. For example, referring to FIGS. 15 and 19, the channel 806 includes RUs of 242 tones. In certain configurations, for each RU of the set of RUs that includes 484 tones, the 484 tones include 468 data tones and 16 pilot tones. For example, referring to FIG. 19, the channel 806 includes RUs 2016 of 484 tones.

In certain configurations, the bandwidth is 20 MHz, 40 MHz, or 80 MHz. In certain configurations, the bandwidth is 20 MHz. The set of RUs includes 9 RUs. Each RU of the set of RUs includes 26 tones. The channel includes a number of DC tones. One RU of the set of RUs includes a first part and a second part. The first part is above the number of DC tones in frequency and the second part is below the number of DC tones in frequency. For example, referring to FIG. 9, the channel 806 includes 9 RUs having 26 tones. The RU-9 918 may be split into two parts, i.e., a center RU-part-9A 918A and a center RU-part-9B 918B, one of which is below the DC tones 920 in frequency and the other is above the DC tones 920 in frequency. Each of the center RU-part-9A 918A and the center RU-part-9B 918B may include 13 tones.

In certain configurations, the bandwidth is 40 MHz. The set of RUs includes 16, 17, 18, or 19 RUs. Each RU of the set of RUs includes 26 tones. In certain configurations, the channel includes 5 or more DC tones. In certain configurations, the set of RUs includes 18 RUs. For example, referring to FIG. 12, the channel 806 includes 16-19 RUs of 26 tones and 5 or more DC tones. In certain configurations, the bandwidth is 40 MHz. The set of RUs includes 2 RUs. Each RU of the set of RUs includes 242 tones. In certain configurations, the channel includes 5 or more DC tones. For example, referring to FIG. 15, the channel 806 includes 2 RUs 1516 of 242 tones and 5 or more DC tones.

In certain configurations, the bandwidth is 80 MHz. The set of RUs includes 32 or more RUs. Each RU of the set of RUs includes 26 tones. In certain configurations, the set of RUs includes 37 RUs. For example, referring to FIG. 16, the channel 806 includes 32 or more RUs of 26 tones. In certain configurations, the bandwidth is 80 MHz. The set of RUs includes 4 RUs. Each RU of the set of RUs includes 242 tones. For example, referring to FIG. 19, the channel 806 includes 4 RUs 1916 of 242 tones. In certain configurations, the bandwidth is 80 MHz. The set of RUs includes 2 RUs. Each RU of the set of RUs includes 484 tones. For example, referring to FIG. 20, the channel 806 includes 2 RUs 2016 of 484 tones.

Figure 22:
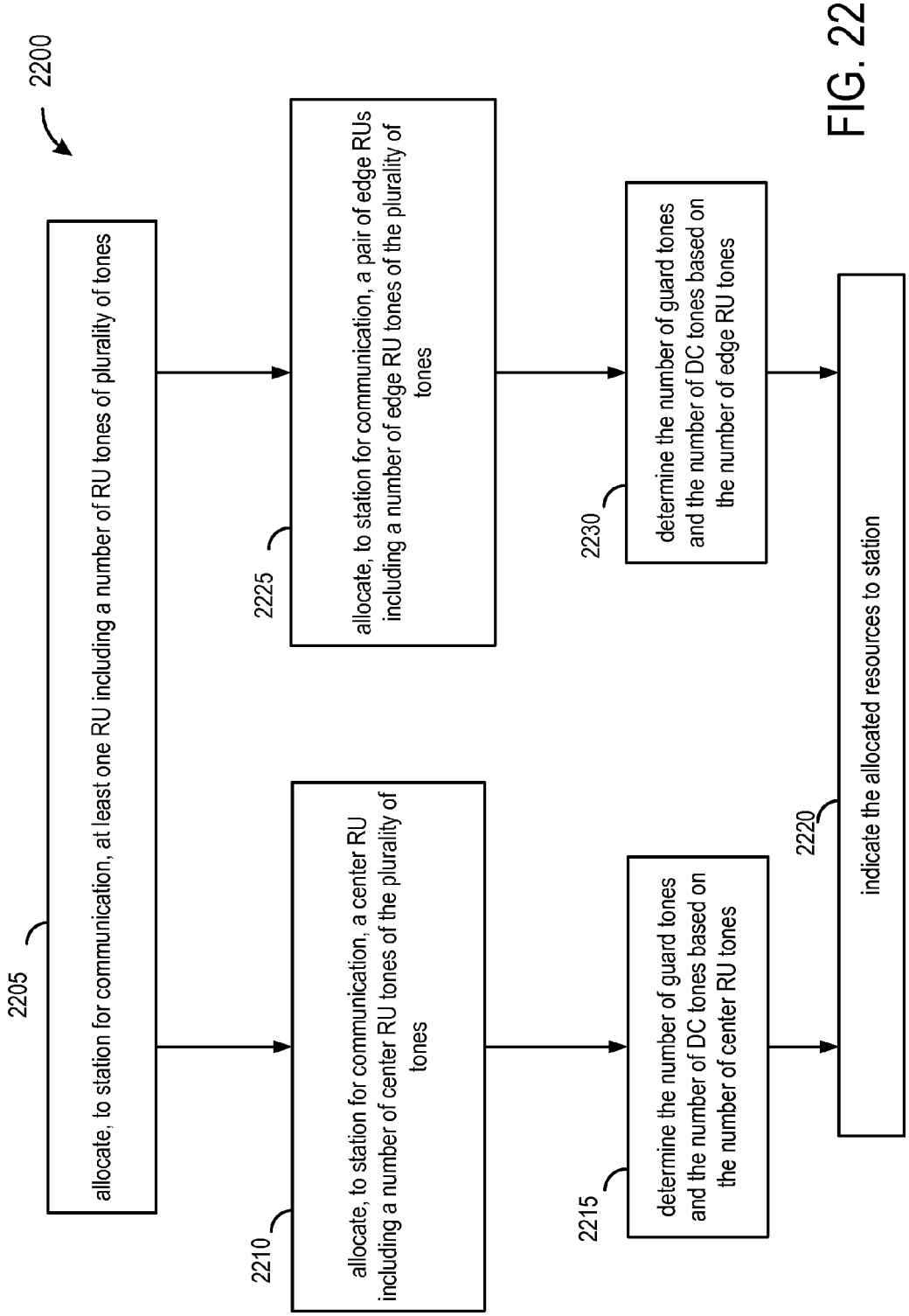
FIG. 22 is a flowchart of an exemplary method of allocating resources of a bandwidth to at least one station.

FIG. 22 is a flowchart of an exemplary method 2200 of allocating resources of a bandwidth to at least one station (e.g., STAs 112, 114, 116, or 118) for communication. The bandwidth includes a plurality of tones. The plurality of tones includes a number of guard tones located at outer edge portions of the bandwidth and a number of DC tones located at a central portion of the bandwidth. The method 2200 may be performed using an apparatus (e.g., the AP 104 or the wireless device 202). Although the method 2200 is described below with respect to the elements of wireless device 202 of FIG. 2, other components may be used to implement one or more of the steps described herein.

At operation 2205, the apparatus allocates, to the at least one station for communication, at least one RU. Each RU includes a number of RU tones of the plurality of tones.

At operation 2210, the apparatus allocates, to the at least one station for communication, a center RU including a number of center RU tones of the plurality of tones. The number of center RU tones is based on a number of the plurality of tones of the bandwidth and the number of RU tones. The RU tones may be located between a guard tone and a center RU tone of the bandwidth, and the center RU tones may be located between an RU tone and a DC tone of the bandwidth. At operation 2215, the apparatus determines the number of guard tones and the number of DC tones based on the number of center RU tones.

Alternatively, after performing the operation at operation 2205, the apparatus proceeds to operation 2225. At operation 2225, the apparatus allocates, to the at least one station for communication, a pair of edge RUs, the pair of edge RUs including a number of edge RU tones of the plurality of tones. The number of edge RU tones is based on a number of the plurality of tones of the bandwidth and the number of RU tones. The RU tones may be located between an edge RU tone and a DC tone of the bandwidth, and the edge RU tones may be located between a guard tone and an RU tone of the bandwidth. At operation 2230, the apparatus determines the number of guard tones and the number of DC tones based on the number of edge RU tones.

After performing the operation at operation 2215 or operation 2230, the apparatus proceeds to operation 2220. At operation 2220, the apparatus indicates the allocated resources to the at least one station by indicating the number of the plurality of tones of the bandwidth, a number of RUs allocated for communication, the number of RU tones of each RU, the number of guard tones, and/or the number of DC tones.

In an aspect, the number of the plurality of tones of the bandwidth is 256, the number of RUs allocated for communication is 8, the number of RU tones of each RU is 26, the number of guard tones is 11, the number of DC tones is 11, and the number of center RU/edge RU tones of the center RU/pair of edge RUs is 26.

In another aspect, the number of the plurality of tones of the bandwidth is 256, the number of RUs allocated for communication is 4, the number of RU tones of each RU is 56, the number of guard tones is 11, the number of DC tones is 7, and the number of center RU/edge RU tones of the center RU/pair of edge RUs is 14.

In another aspect, the number of the plurality of tones of the bandwidth is 256, the number of RUs allocated for communication is 2, the number of RU tones of each RU is 114, the number of guard tones is 11, the number of DC tones is 3, and the number of center RU/edge RU tones of the center RU/pair of edge RUs is 14.

In another aspect, the number of the plurality of tones of the bandwidth is 256, the number of RUs allocated for communication is 2, the number of RU tones of each RU is 114, the number of guard tones is 9, the number of DC tones is 5, and the number of center RU/edge RU tones of the center RU/pair of edge RUs is 14.

In another aspect, the number of the plurality of tones of the bandwidth is 512, the number of RUs allocated for communication is 16, the number of RU tones of each RU is 26, the number of guard tones is 11, the number of DC tones is 7, and the number of center RU/edge RU tones of the center RU/pair of edge RUs is 78.

In another aspect, the number of the plurality of tones of the bandwidth is 512, the number of RUs allocated for communication is 8, the number of RU tones of each RU is 56, the number of guard tones is 11, the number of DC tones is 11, and the number of center RU/edge RU tones of the center RU/pair of edge RUs is 42.

In another aspect, the number of the plurality of tones of the bandwidth is 512, the number of RUs allocated for communication is 4, the number of RU tones of each RU is 114, the number of guard tones is 11, the number of DC tones is 3, and the number of center RU/edge RU tones of the center RU/pair of edge RUs is 42.

In another aspect, the number of the plurality of tones of the bandwidth is 512, the number of RUs allocated for communication is 4, the number of RU tones of each RU is 114, the number of guard tones is 9, the number of DC tones is 5, and the number of center RU/edge RU tones of the center RU/pair of edge RUs is 42.

In another aspect, the number of the plurality of tones of the bandwidth is 512, the number of RUs allocated for communication is 2, the number of RU tones of each RU is 242, the number of guard tones is 11, the number of DC tones is 3, and the number of center RU/edge RU tones of the center RU/pair of edge RUs is 14.

In another aspect, the number of the plurality of tones of the bandwidth is 512, the number of RUs allocated for communication is 2, the number of RU tones of each RU is 242, the number of guard tones is 9, the number of DC tones is 5, and the number of center RU/edge RU tones of the center RU/pair of edge RUs is 14.

In another aspect, the number of the plurality of tones of the bandwidth is 1024, the number of RUs allocated for communication is 32, the number of RU tones of each RU is 26, the number of guard tones is 11, the number of DC tones is 11, and the number of center RU/edge RU tones of the center RU/pair of edge RUs is 170.

In another aspect, the number of the plurality of tones of the bandwidth is 1024, the number of RUs allocated for communication is 16, the number of RU tones of each RU is 56, the number of guard tones is 11, the number of DC tones is 5, and the number of center RU/edge RU tones of the center RU/pair of edge RUs is 112.

In another aspect, the number of the plurality of tones of the bandwidth is 1024, the number of RUs allocated for communication is 8, the number of RU tones of each RU is 114, the number of guard tones is 11, the number of DC tones is 5, and the number of center RU/edge RU tones of the center RU/pair of edge RUs is 96.

In another aspect, the number of the plurality of tones of the bandwidth is 1024, the number of RUs allocated for communication is 4, the number of RU tones of each RU is 242, the number of guard tones is 11, the number of DC tones is 3, and the number of center RU/edge RU tones of the center RU/pair of edge RUs is 42.

In another aspect, the number of the plurality of tones of the bandwidth is 1024, the number of RUs allocated for communication is 4, the number of RU tones of each RU is 242, the number of guard tones is 9, the number of DC tones is 5, and the number of center RU/edge RU tones of the center RU/pair of edge RUs is 42.

In another aspect, the number of the plurality of tones of the bandwidth is 1024, the number of RUs allocated for communication is 2, the number of RU tones of each RU is 484, the number of guard tones is 11, the number of DC tones is 3, and the number of center RU/edge RU tones of the center RU/pair of edge RUs is 42.

In another aspect, the number of the plurality of tones of the bandwidth is 1024, the number of RUs allocated for communication is 2, the number of RU tones of each RU is 484, the number of guard tones is 9, the number of DC tones is 5, and the number of center RU/edge RU tones of the center RU/pair of edge RUs is 42.

Figure 23:
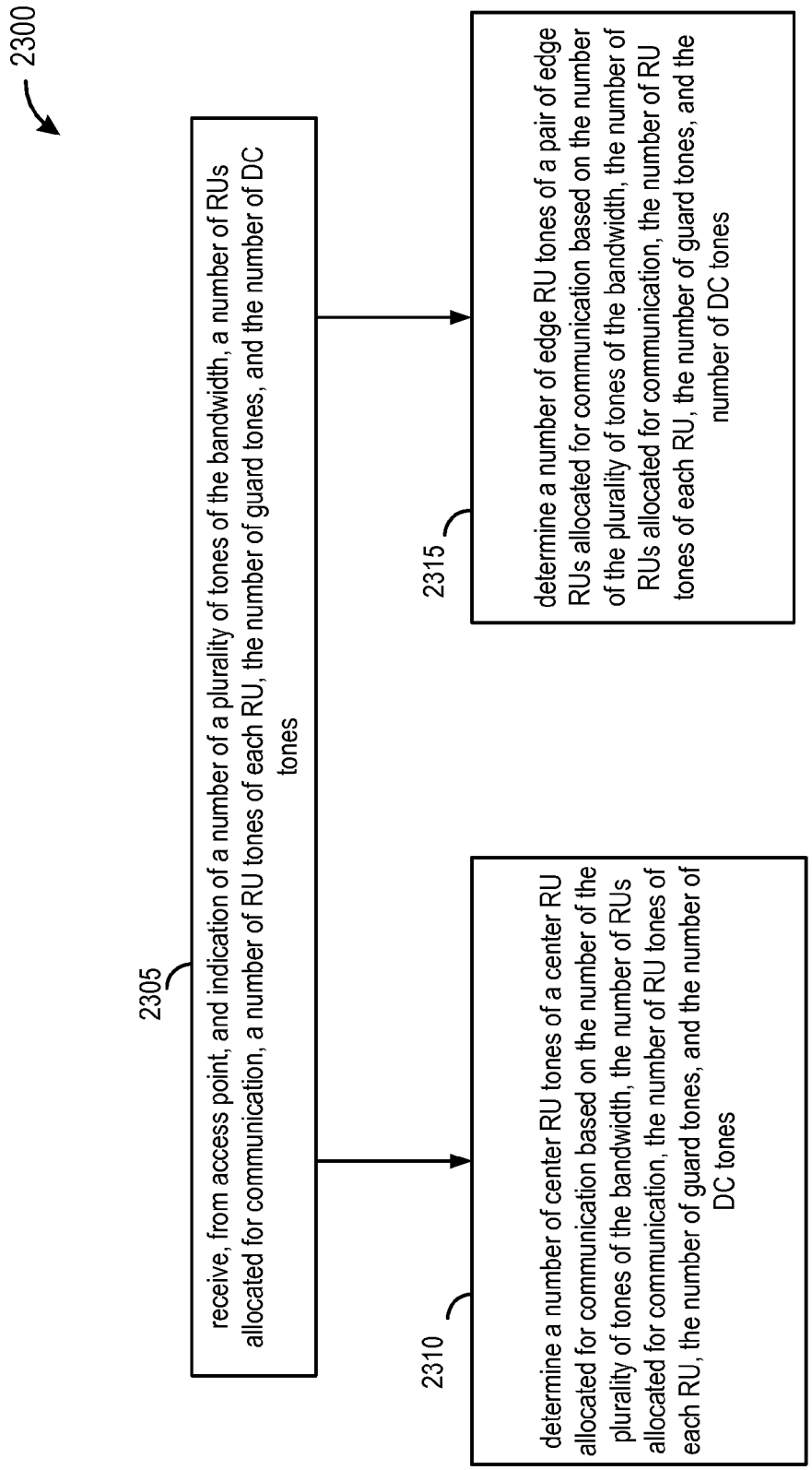
FIG. 23 is a flowchart of an exemplary method of determining an allocation of resources of a bandwidth for communication with an access point.

FIG. 23 is a flowchart of an exemplary method 2300 of determining an allocation of resources of a bandwidth for communication with an access point (e.g., AP 104). The bandwidth includes a plurality of tones. The plurality of tones includes a number of guard tones located at outer edge portions of the bandwidth and a number of direct current (DC) tones located at a central portion of the bandwidth. The method 2300 may be performed using an apparatus (e.g., any one of STAs 112, 114, 116, or 118 or the wireless device 202). Although the method 2300 is described below with respect to the elements of wireless device 202 of FIG. 2, other components may be used to implement one or more of the steps described herein.

At operation 2305, the apparatus receives, from the access point (e.g., AP 104), an indication of a number of the plurality of tones of the bandwidth, a number of RUs allocated for communication, a number of RU tones of each RU, the number of guard tones, and the number of DC tones.

At operation 2310, the apparatus determines a number of center RU tones of a center operation allocated for communication based on the number of the plurality of tones of the bandwidth, the number of RUs allocated for communication, the number of RU tones of each RU, the number of guard tones, and the number of DC tones. For example, the apparatus may determine the number of allocated center RU tones when expecting to receive an acknowledgment (ACK) message. The RU tones may be located between a guard tone and a center RU tone of the bandwidth, and the center RU tones may be located between an RU tone and a DC tone of the bandwidth.

Alternatively, after performing the operation at operation 2305, the apparatus may proceed to operation 2315. At operation 2315, the apparatus determines a number of edge RU tones of a pair of edge RUs allocated for communication based on the number of the plurality of tones of the bandwidth, the number of RUs allocated for communication, the number of RU tones of each RU, the number of guard tones, and the number of DC tones. For example, the apparatus may determine the number of allocated edge RU tones when expecting to receive an acknowledgment (ACK) message. The RU tones may be located between an edge RU tone and a DC tone of the bandwidth, and the edge RU tones may be located between a guard tone and an RU tone of the bandwidth.

Figure 24:
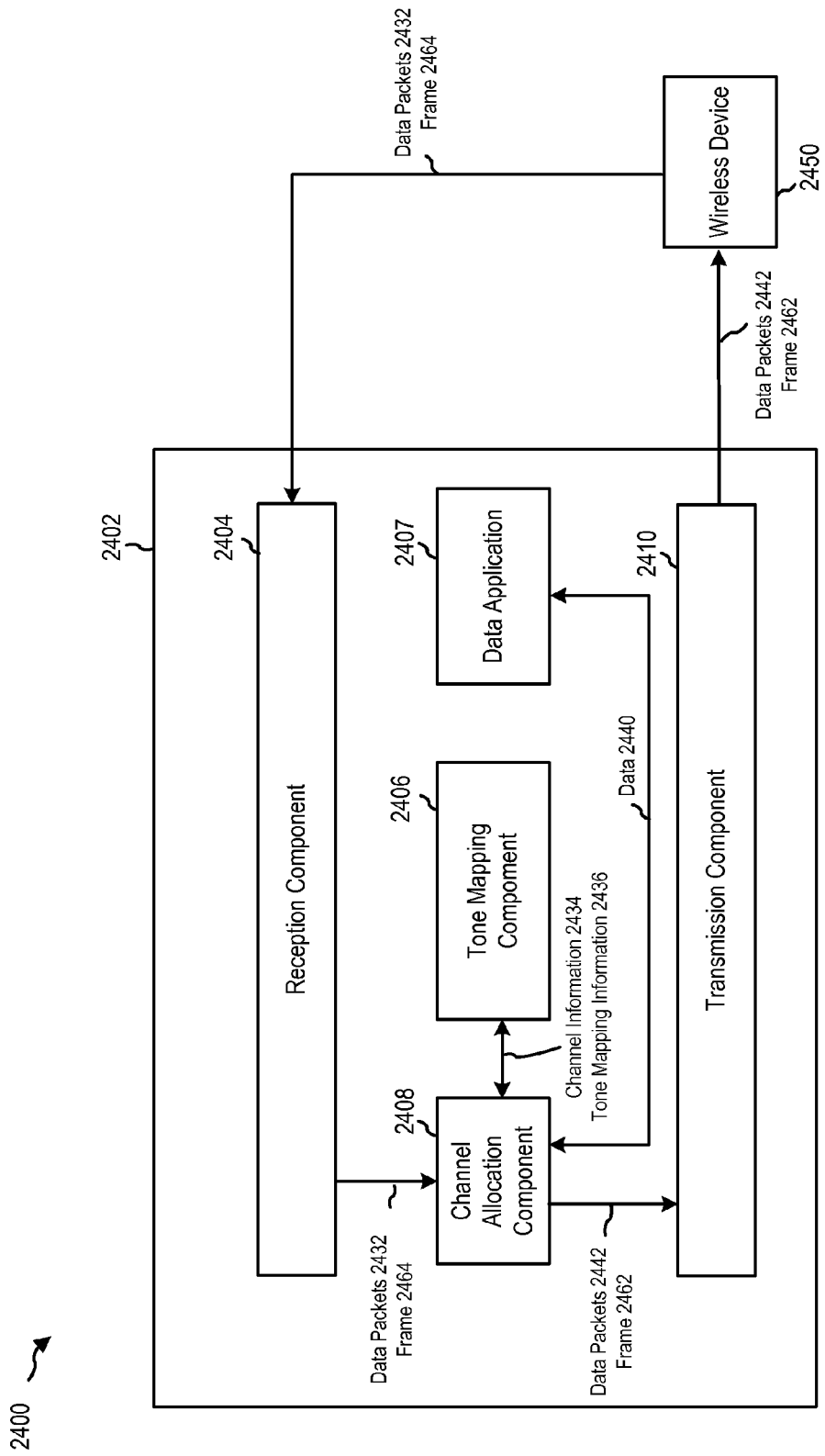
FIG. 24 is a conceptual data flow diagram illustrating the data flow between different components/means in an exemplary apparatus.

FIG. 24 is a conceptual data flow diagram 2400 illustrating the data flow between different components/means in an exemplary apparatus 2402. The apparatus may be a wireless device. The apparatus includes a reception component 2404, a tone mapping component 2406, a data application 2407, a channel allocation component 2408, and a transmission component 2410.

The reception component 2404 and the transmission component 2410 may be configured to communicate data packets 2432 and data packets 2442 with at least one wireless device 2450 on a channel of a bandwidth. The bandwidth may include a plurality of tones. The plurality of tones include a number of guard tones located at outer edge portions of the bandwidth and a number of DC tones located at a central portion of the bandwidth.

In one aspect, the apparatus 2402 may be an AP. The tone mapping component 2406 may be configured to receive channel information 2434 from the channel allocation component 2408. The channel information 2434 may include information regarding the bandwidth. The tone mapping component 2406 may be configured to determine an allocation of the channel that divides the bandwidth of the channel in a transmission time period into a set of RUs for data communication. Each RU of the set of RUs includes at least 26 tones. For example, the tone mapping component 2406 may be configured to allocate the plurality of tones excluding the guard tones and the DC tones in a transmission time period to the set of RUs that extends across the bandwidth of the channel. The tone mapping component 2406 may be configured to send information regarding the determined tone mapping, e.g., tone mapping information 2436, to the channel allocation component 2408.

The channel allocation component 2408 may be configured to allocate a respective subset of the set of RUs for communicating data with each of the at least one wireless device 2450. Each of the respective subsets of RUs includes less RUs than the set of RUs. The channel allocation component 2408 may be configured to send a frame 2462 to the transmission component 2410. The frame 2462 includes information indicating the allocation plurality of subsets. The transmission component 2410 transmits the frame 2462 to the at least one wireless device 2450. The channel allocation component 2408 may be configured to communicate data received from the data application 2407 with each of the at least one wireless device 2450 in the respective subset of RUs allocated for communicating data with the each wireless device 2450. The at least one wireless device 2450 may include a plurality of wireless devices 2450.

In another aspect, the apparatus 2402 may be a STA. A particular wireless device 2450 may be an AP. The reception component 2404 may be configured to receive a frame 2464 that includes information indicating allocation of a particular subset of the set of RUs. The reception component 2404 may be configured to send the frame 2464 to the channel allocation component 2408. The channel allocation component 2408 accordingly instructs the reception component 2404 and the transmission component 2410 to communicate data with the particular wireless device 2450 by using the particular subset of RUs.

More specifically, the reception component 2404 may be configured to receive one or more data packets 2432 (e.g., one or more physical layer packets 700) from a particular wireless device 2450. The reception component 2404 may be configured to send the data packets 2432 to the channel allocation component 2408. The channel allocation component 2408 determines, based on the tone mapping information 2436 received from the tone mapping component 2406, the one or more particular RUs allocated for communicating with the particular wireless device 2450. Thus, the channel allocation component 2408 may obtain data 2440 carried in the particular RUs of the data packets 2432 that are from the particular wireless device 2450. The channel allocation component 2408 may be configured to send the data 2440 received from the particular wireless device 2450 to the data application 2407. Further, the data application 2407 may send data 2440 to be transmitted to the particular wireless device 2450 to the channel allocation component 2408. The channel allocation component 2408 may be configured to construct one or more data packets 2442 (e.g., one or more physical layer packets 700) with the particular RUs allocated for communicating the particular wireless device 2450. The particular RUs include the data 2440 to be transmitted to the particular wireless device 2450. The channel allocation component 2408 may be configured to send the data packets 2442 to the transmission component 2410, which in turn transmits the data packets 2442 to the particular wireless device 2450.

In certain configurations, the RUs of the set of RUs have a size of at least one of 26, 242, or 484 tones. In certain configurations, for each RU of the set of RUs that includes 26 tones, the 26 tones include 24 data tones and 2 pilot tones. In certain configurations, for each RU of the set of RUs that includes 242 tones, the 242 tones include 234 data tones and 8 pilot tones. In certain configurations, for each RU of the set of RUs that includes 484 tones, the 484 tones include 468 data tones and 16 pilot tones.

In certain configurations, the bandwidth is 20 MHz, 40 MHz, or 80 MHz. In certain configurations, the bandwidth is 20 MHz. The set of RUs includes 9 RUs. Each RU of the set of RUs includes 26 tones. The channel includes a number of DC tones. One RU of the set of RUs includes a first part and a second part. The first part is above the number of DC tones in frequency and the second part is below the number of DC tones in frequency.

In certain configurations, the bandwidth is 40 MHz. The set of RUs includes 16, 17, 18, or 19 RUs. Each RU of the set of RUs includes 26 tones. In certain configurations, the channel includes 5 or more DC tones. In certain configurations, the set of RUs includes 18 RUs. In certain configurations, the bandwidth is 40 MHz. The set of RUs includes 2 RUs. Each RU of the set of RUs includes 242 tones. In certain configurations, the channel includes 5 or more DC tones.

In certain configurations, the bandwidth is 80 MHz. The set of RUs includes 32 or more RUs. Each RU of the set of RUs includes 26 tones. In certain configurations, the set of RUs includes 37 RUs. In certain configurations, the bandwidth is 80 MHz. The set of RUs includes 4 RUs. Each RU of the set of RUs includes 242 tones. In certain configurations, the bandwidth is 80 MHz. The set of RUs includes 2 RUs. Each RU of the set of RUs includes 484 tones.

The apparatus may include additional components that perform each of the blocks of the algorithm in the aforementioned flowcharts of FIGS. 21-23. As such, each block in the aforementioned flowcharts of FIGS. 21-23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The tone mapping component 2406 and the channel allocation component 2408 may constitute the resource allocation component 224 shown in FIG. 2. The resource allocation component 224 may employ the processor 204, the memory 206, the signal detector 218, the DSP 220, and/or the user interface 222. The reception component 2404 and the transmission component 2410 may employ the processor 204, the memory 206, the signal detector 218, and/or the DSP 220. The transceiver 214 receives a signal from the one or more antennas 216, extracts information from the received signal, and provides the extracted information to the reception component 2404. In addition, the transceiver 214 receives information from the VT, and based on the received information, generates a signal to be applied to the one or more antennas 216.

In one aspect, the wireless device 202/apparatus 2402 may be a wireless device. The wireless device 202/apparatus 2402 may be configured to include means for performing the operations illustrated in FIGS. 21-23. More specifically, the wireless device 202/apparatus 2402 may be configured to include means for determining a first subset of resource units (RUs) of a set of RUs that extends across a bandwidth of a channel in a transmission time period, the first subset of RUs including less RUs than the set of RUs, each RU of the set of RUs including at least 26 tones. The wireless device 202/apparatus 2402 may be configured to include means for communicating at least one of data or control information in the first subset of the RUs.

In certain configurations, the bandwidth comprises a plurality of tones, and wherein the plurality of tones include a number of guard tones located at outer edge portions of the bandwidth and a number of direct current (DC) tones located at a central portion of the bandwidth.

In certain configurations, the wireless device 202/apparatus 2402 is an AP. The wireless device 202/apparatus 2402 may be configured to include means for allocating the plurality of tones excluding the guard tones and the DC tones in the transmission time period to the set of RUs. The wireless device 202/apparatus 2402 may be configured to include means for allocating a plurality of subsets of the set of RUs for communication with a plurality of STAs. The first subset is for communication with a first STA and is determined based on the allocation of the plurality of subsets. The communication of the at least one of data or control information in the first subset is with the first STA. In certain configurations, the wireless device 202/apparatus 2402 may be configured to include means for transmitting a frame to the plurality of STAs. The frame includes information indicating the allocation plurality of subsets.

In certain configurations, the wireless device 202/apparatus 2402 may be configured to include means for determining a second subset of RUs of the set of RUs for communication with a second STA of the plurality of STAs based on the allocation of the plurality of subsets, the second subset of RUs including less RUs than the set of RUs. The wireless device 202/apparatus 2402 may be configured to include means for communicating at least one of data or control information in the second subset of the RUs with the second STA. In certain configurations, the communication with the first STA and the communication with second STA are concurrent.

In certain configurations, the wireless device 202/apparatus 2402 is a STA. The wireless device 202/apparatus 2402 may be configured to include means for receiving a frame that includes information indicating allocation of the first subset of the set of RUs for communicating with the wireless device 202/apparatus 2402. The first subset is determined based on the allocation.

In certain configurations, the RUs of the set of RUs have a size of at least one of 26, 242, or 484 tones. In certain configurations, for each RU of the set of RUs that includes 26 tones, the 26 tones include 24 data tones and 2 pilot tones. In certain configurations, for each RU of the set of RUs that includes 242 tones, the 242 tones include 234 data tones and 8 pilot tones. In certain configurations, for each RU of the set of RUs that includes 484 tones, the 484 tones include 468 data tones and 16 pilot tones.

In certain configurations, the bandwidth is 20 MHz, 40 MHz, or 80 MHz. In certain configurations, the bandwidth is 20 MHz. The set of RUs includes 9 RUs. Each RU of the set of RUs includes 26 tones. The channel includes a number of DC tones. One RU of the set of RUs includes a first part and a second part. The first part is above the number of DC tones in frequency and the second part is below the number of DC tones in frequency.

In certain configurations, the bandwidth is 40 MHz. The set of RUs includes 16, 17, 18, or 19 RUs. Each RU of the set of RUs includes 26 tones. In certain configurations, the channel includes 5 or more DC tones. In certain configurations, the set of RUs includes 18 RUs. In certain configurations, the bandwidth is 40 MHz. The set of RUs includes 2 RUs. Each RU of the set of RUs includes 242 tones. In certain configurations, the channel includes 5 or more DC tones.

In certain configurations, the bandwidth is 80 MHz. The set of RUs includes 32 or more RUs. Each RU of the set of RUs includes 26 tones. In certain configurations, the set of RUs includes 37 RUs. In certain configurations, the bandwidth is 80 MHz. The set of RUs includes 4 RUs. Each RU of the set of RUs includes 242 tones. In certain configurations, the bandwidth is 80 MHz. The set of RUs includes 2 RUs. Each RU of the set of RUs includes 484 tones.

The aforementioned means may be one or more of the aforementioned components of the wireless device 202/apparatus 2402 configured to perform the functions recited by the aforementioned means. The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Figure 25:
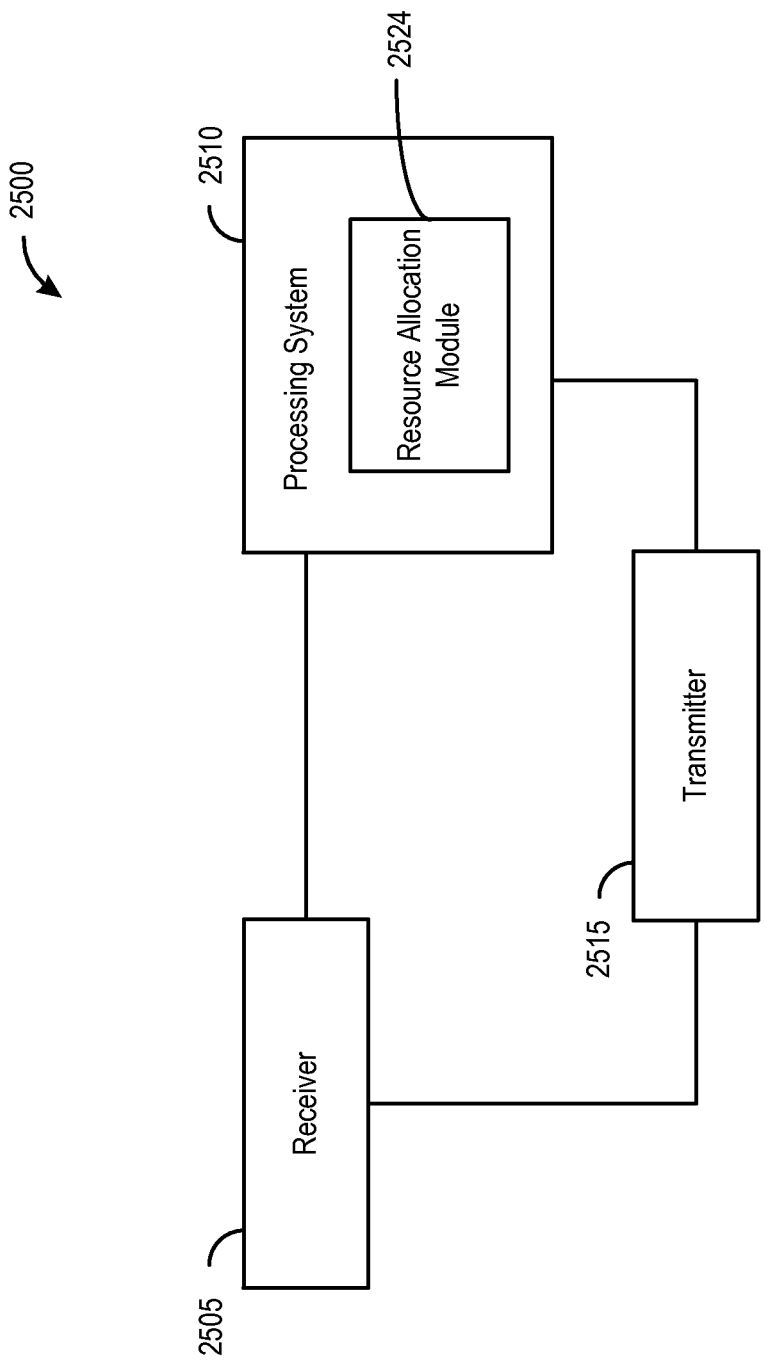
FIG. 25 is a functional block diagram of an exemplary wireless communication device.

FIG. 25 is a functional block diagram of an exemplary wireless communication device 2500. The wireless communication device 2500 may be implemented as an AP (e.g., AP 104) or a station (e.g., STA 112, 114, 116, or 118). The wireless communication device 2500 may include a receiver 2505, a processing system 2510, and a transmitter 2515. The processing system 2510 may include a resource allocation component 2524.

The processing system 2510 and/or the resource allocation component 2524 may be configured to allocate resources of a bandwidth to at least one station (e.g., STAs 112, 114, 116, or 118) for communication. The bandwidth may include a plurality of tones. The plurality of tones includes a number of guard tones located at outer edge portions of the bandwidth and a number of DC tones located at a central portion of the bandwidth.

The processing system 2510 and/or the resource allocation component 2524 may be configured to allocate, to the at least one station for communication, at least one RU. Each RU includes a number of RU tones of the plurality of tones. The processing system 2510 and/or the resource allocation component 2524 may further be configured to allocate, to the at least one station for communication, a center RU including a number of center RU tones of the plurality of tones. The number of center RU tones may be based on a number of the plurality of tones of the bandwidth and the number of RU tones. The RU tones may be located between a guard tone and a center RU tone of the bandwidth, and the center RU tones may be located between an RU tone and a DC tone of the bandwidth. The processing system 2510 and/or the resource allocation component 2524 may also be configured to determine the number of guard tones and the number of DC tones based on the number of center RU tones.

The processing system 2510 and/or the resource allocation component 2524 may be configured to allocate, to the at least one station for communication, a pair of edge RUs, the pair of edge RUs including a number of edge RU tones of the plurality of tones. The number of edge RU tones may be based on a number of the plurality of tones of the bandwidth and the number of RU tones. The RU tones may be located between an edge RU tone and a DC tone of the bandwidth, and the edge RU tones may be located between a guard tone and an RU tone of the bandwidth. The processing system 2510 and/or the resource allocation component 2524 may also be configured to determine the number of guard tones and the number of DC tones based on the number of edge RU tones.

The transmitter 2515, the processing system 2510, and/or the resource allocation component 2524 may be configured to indicate the allocated resources to the at least one station by indicating the number of the plurality of tones of the bandwidth, a number of RUs allocated for communication, the number of RU tones of each RU, the number of guard tones, and/or the number of DC tones.

In an aspect, the processing system 2510 and/or the resource allocation component 2524 may be configured to determine an allocation of resources of a bandwidth for communication with an access point (e.g., AP 104). The bandwidth may include a plurality of tones. The plurality of tones includes a number of guard tones located at outer edge portions of the bandwidth and a number of direct current (DC) tones located at a central portion of the bandwidth.

The receiver 2505, the processing system 2510, and/or the resource allocation component 2524 may be configured to receive, from the access point (e.g., AP 104), an indication of a number of the plurality of tones of the bandwidth, a number of standard blocks (RUs) allocated for communication, a number of RU tones of each standard block (RU), the number of guard tones, and the number of DC tones.

The processing system 2510 and/or the resource allocation component 2524 may be configured to determine a number of center block (center RU) tones of a center block allocated for communication based on the number of the plurality of tones of the bandwidth, the number of RUs allocated for communication, the number of RU tones of each RU, the number of guard tones, and the number of DC tones. The RU tones may be located between a guard tone and a center RU tone of the bandwidth, and the center RU tones may be located between an RU tone and a DC tone of the bandwidth.

The processing system 2510 and/or the resource allocation component 2524 may be configured to determine a number of edge RU tones of a pair of edge blocks allocated for communication based on the number of the plurality of tones of the bandwidth, the number of RUs allocated for communication, the number of RU tones of each RU, the number of guard tones, and the number of DC tones. The RU tones may be located between an edge RU tone and a DC tone of the bandwidth, and the edge RU tones may be located between a guard tone and an RU tone of the bandwidth.

The receiver 2505, the processing system 2510, the resource allocation component 2524, and/or the transmitter 2515 may be configured to perform one or more functions discussed above with respect to FIGS. 21-23. The receiver 2505 may correspond to the receiver 212. The processing system 2510 may correspond to the processor 204. The transmitter 2515 may correspond to the transmitter 210. The resource allocation component 2524 may correspond to the resource allocation component 124 (of AP 104), the resource allocation component 126 (of STA 114), and/or the resource allocation component 224 (of wireless device 202).

Moreover means for allocating resources of a bandwidth to at least one station for communication may include the processing system 2510 and/or the resource allocation component 2524. Means for indicating the allocated resources to the at least one station may include the transmitter 2515, the processing system 2510, and/or the resource allocation component 2524. Means for determining a resource allocation of a bandwidth for communication with an access point may include the receiver 2505, the processing system 2510, and/or the resource allocation component 2524.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may include non-transitory computer readable medium (e.g., tangible media).

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may include a computer-readable medium for performing the operations presented herein. For example, such a computer-readable medium may include a computer readable medium having instructions stored (and/or encoded) thereon, the instructions being executable by one or more processors to perform the operations described herein. For certain aspects, the computer-readable medium may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of wireless communication of a wireless device, the wireless device being a station (STA) or an access point (AP), comprising:
    determining a first subset of resource units (RUs) of a set of RUs that extends across a bandwidth of a channel in a transmission time period, the bandwidth comprising a plurality of tones, the plurality of tones including a number of direct current (DC) tones located at a central portion of the bandwidth, a first set of guard tones located at an upper outer edge portion of the bandwidth, and a second set of guard tones located at a lower outer edge portion of the bandwidth, the first subset of RUs including less RUs than the set of RUs, remaining RUs in the set of RUs other than the first subset of RUs being standard blocks, each RU of the set of RUs including at least 26 tones; and
    communicating at least one of data or control information in the first subset of the RUs,
    wherein the first subset of RUs includes x tones, and the x tones comprise a first set of x/2 tones with a frequency greater than the DC tones and less than the first set of guard tones and comprises a second set of x/2 tones with a frequency less than the DC tones and greater than the second set of guard tones,
    wherein:
    the first subset of RUs is a center block, the first set of x/2 tones is adjacent in frequency to the DC tones and the second set of x/2 tones is adjacent in frequency to the DC tones, or
    the first subset of RUs is an edge block, the first set of x/2 tones is adjacent in frequency to the first set of guard tones and the second set of x/2 tones is adjacent in frequency to the second set of guard tones.

2. The method of claim 1, wherein the wireless device is an AP, the method further comprising:
    allocating the plurality of tones excluding the guard tones and the DC tones in the transmission time period to the set of RUs; and
    allocating a plurality of subsets of the set of RUs for communication with a plurality of STAs, wherein the first subset is for communication with a first STA and is determined based on the allocation of the plurality of subsets, and wherein the communication of the at least one of data or control information in the first subset is with the first STA.

3. The method of claim 2, further comprising transmitting a frame to the plurality of STAs, wherein the frame includes information indicating the allocation plurality of sub sets.

4. The method of claim 2, further comprising:
    determining a second subset of RUs of the set of RUs for communication with a second STA of the plurality of STAs based on the allocation of the plurality of subsets, the second subset of RUs including less RUs than the set of RUs; and
    communicating at least one of data or control information in the second subset of the RUs with the second STA.

5. The method of claim 2, wherein the communication with the first STA and the communication with second STA are concurrent.

6. The method of claim 1, wherein the wireless device is a STA, the method further comprising receiving a frame that includes information indicating allocation of the first subset of the set of RUs for communicating with the wireless device, wherein the first subset is determined based on the allocation.

7. The method of claim 1, wherein the RUs of the set of RUs have a size of at least one of 26, 242, or 484 tones.

8. The method of claim 1, wherein for each RU of the set of RUs that includes 26 tones, the 26 tones includes 24 data tones and 2 pilot tones.

9. The method of claim 1, wherein for each RU of the set of RUs that includes 242 tones, the 242 tones include 234 data tones and 8 pilot tones.

10. The method of claim 1, wherein for each RU of the set of RUs that includes 484 tones, the 484 tones include 468 data tones and 16 pilot tones.

11. The method of claim 1, wherein the bandwidth is 20 MHz, 40 MHz, or 80 MHz.

12. The method of claim 1, wherein the bandwidth is 20 MHz, wherein the set of RUs includes 9 RUs, wherein each RU of the set of RUs includes 26 tones, and
    wherein the channel includes a number of direct current (DC) tones, wherein one RU of the set of RUs includes a first part and a second part, and wherein the first part is above the number of DC tones in frequency and the second part is below the number of DC tones in frequency.

13. The method of claim 1, wherein the bandwidth is 40 MHz, wherein the set of RUs includes 16, 17, 18, or 19 RUs, and wherein each RU of the set of RUs includes 26 tones.

14. The method of claim 13, wherein the set of RUs includes 18 RUs.

15. The method of claim 13, wherein the channel includes 5 or more direct current (DC) tones.

16. The method of claim 1, wherein the bandwidth is 40 MHz, wherein the set of RUs includes 2 RUs, and wherein each RU of the set of RUs includes 242 tones.

17. The method of claim 16, wherein the channel includes 5 or more direct current (DC) tones.

18. The method of claim 1, wherein the bandwidth is 80 MHz, wherein the set of RUs includes 32 or more RUs, and wherein each RU of the set of RUs includes 26 tones.

19. The method of claim 18, wherein the set of RUs includes 37 RUs.

20. The method of claim 1, wherein the bandwidth is 80 MHz, wherein the set of RUs includes 4 RUs, and wherein each RU of the set of RUs includes 242 tones.

21. The method of claim 1, wherein the bandwidth is 80 MHz, wherein the set of RUs includes 2 RUs, and wherein each RU of the set of RUs includes 484 tones.

22. An apparatus for wireless communication, the apparatus being a station (STA) or an access point (AP), comprising:
a memory; and
at least one processor coupled to the memory and configured to:
determine a first subset of resource units (RUs) of a set of RUs that extends across a bandwidth of a channel in a transmission time period, the bandwidth comprising a plurality of tones, the plurality of tones including a number of direct current (DC) tones located at a central portion of the bandwidth, a first set of guard tones located at an upper outer edge portion of the bandwidth, and a second set of guard tones located at a lower outer edge portion of the bandwidth, the first subset of RUs including less RUs than the set of RUs, remaining RUs in the set of RUs other than the first subset of RUs being standard blocks, each RU of the set of RUs including at least 26 tones; and
communicate at least one of data or control information in the first subset of the RUs,
wherein the first subset of RUs includes x tones, and the x tones comprise a first set of x/2 tones with a frequency greater than the DC tones and less than the first set of guard tones and comprises a second set of x/2 tones with a frequency less than the DC tones and greater than the second set of guard tones,
wherein:
the first subset of RUs is a center block, the first set of x/2 tones is adjacent in frequency to the DC tones and the second set of x/2 tones is adjacent in frequency to the DC tones, or
the first subset of RUs is an edge block, the first set of x/2 tones is adjacent in frequency to the first set of guard tones and the second set of x/2 tones is adjacent in frequency to the second set of guard tones.

23. The apparatus of claim 22, wherein the apparatus is an AP, and wherein the at least one processor is further configured to:
allocate the plurality of tones excluding the guard tones and the DC tones in the transmission time period to the set of RUs; and
allocate a plurality of subsets of the set of RUs for communication with a plurality of STAs, wherein the first subset is for communication with a first STA and is determined based on the allocation of the plurality of subsets, and wherein the communication of the at least one of data or control information in the first subset is with the first STA.

24. The apparatus of claim 23, wherein the at least one processor is further configured to transmit a frame to the plurality of STAs, wherein the frame includes information indicating the allocation plurality of subsets.

25. The apparatus of claim 23, wherein the at least one processor is further configured to:
determine a second subset of RUs of the set of RUs for communication with a second STA of the plurality of STAs based on the allocation of the plurality of subsets, the second subset of RUs including less RUs than the set of RUs; and
communicate at least one of data or control information in the second subset of the RUs with the second STA.

26. The apparatus of claim 23, wherein the communication with the first STA and the communication with second STA are concurrent.

27. The apparatus of claim 22, wherein the apparatus is a STA, wherein the at least one processor is further configured to receive a frame that includes information indicating allocation of the first subset of the set of RUs for communicating with the apparatus, and wherein the first subset is determined based on the allocation.

28. The apparatus of claim 22, wherein the RUs of the set of RUs have a size of at least one of 26, 242, or 484 tones.

29. The apparatus of claim 22, wherein for each RU of the set of RUs that includes 26 tones, the 26 tones includes 24 data tones and 2 pilot tones.

30. The apparatus of claim 22, wherein for each RU of the set of RUs that includes 242 tones, the 242 tones include 234 data tones and 8 pilot tones.

31. The apparatus of claim 22, wherein for each RU of the set of RUs that includes 484 tones, the 484 tones include 468 data tones and 16 pilot tones.

32. The apparatus of claim 22, wherein the bandwidth is 20 MHz, 40 MHz, or 80 MHz.

33. The apparatus of claim 22, wherein the bandwidth is 20 MHz, wherein the set of RUs includes 9 RUs, wherein each RU of the set of RUs includes 26 tones, and
wherein the channel includes a number of direct current (DC) tones, wherein one RU of the set of RUs includes a first part and a second part, and wherein the first part is above the number of DC tones in frequency and the second part is below the number of DC tones in frequency.

34. The apparatus of claim 22, wherein the bandwidth is 40 MHz, wherein the set of RUs includes 16, 17, 18, or 19 RUs, and wherein each RU of the set of RUs includes 26 tones.

35. The apparatus of claim 34, wherein the set of RUs includes 18 RUs.

36. The apparatus of claim 34, wherein the channel includes 5 or more direct current (DC) tones.

37. The apparatus of claim 22, wherein the bandwidth is 40 MHz, wherein the set of RUs includes 2 RUs, and wherein each RU of the set of RUs includes 242 tones.

38. The apparatus of claim 37, wherein the channel includes 5 or more direct current (DC) tones.

39. The apparatus of claim 22, wherein the bandwidth is 80 MHz, wherein the set of RUs includes 32 or more RUs, and wherein each RU of the set of RUs includes 26 tones.

40. The apparatus of claim 39, wherein the set of RUs includes 37 RUs.

41. The apparatus of claim 22, wherein the bandwidth is 80 MHz, wherein the set of RUs includes 4 RUs, and wherein each RU of the set of RUs includes 242 tones.

42. The apparatus of claim 22, wherein the bandwidth is 80 MHz, wherein the set of RUs includes 2 RUs, and wherein each RU of the set of RUs includes 484 tones.

43. An apparatus for wireless communication, the apparatus being a station (STA) or an access point (AP), comprising:
means for determining a first subset of resource units (RUs) of a set of RUs that extends across a bandwidth of a channel in a transmission time period, the bandwidth comprising a plurality of tones, the plurality of tones including a number of direct current (DC) tones located at a central portion of the bandwidth, a first set of guard tones located at an upper outer edge portion of the bandwidth, and a second set of guard tones located at a lower outer edge portion of the bandwidth, the first subset of RUs including less RUs than the set of RUs, remaining RUs in the set of RUs other than the first subset of RUs being standard blocks, each RU of the set of RUs including at least 26 tones; and means for communicating at least one of data or control information in the first subset of the RUs, wherein the first subset of RUs includes x tones, and the x tones comprise a first set of x/2 tones with a frequency greater than the DC tones and less than the first set of guard tones and comprises a second set of x/2 tones with a frequency less than the DC tones and greater than the second set of guard tones, wherein:

the first subset of RUs is a center block, the first set of x/2 tones is adjacent in frequency to the DC tones and the second set of x/2 tones is adjacent in frequency to the DC tones, or the first subset of RUs is an edge block, the first set of x/2 tones is adjacent in frequency to the first set of guard tones and the second set of x/2 tones is adjacent in frequency to the second set of guard tones.

44. The apparatus of claim 43, wherein the apparatus is an AP, the apparatus further comprising:

means for allocating the plurality of tones excluding the guard tones and the DC tones in the transmission time period to the set of RUs; and means for allocating a plurality of subsets of the set of RUs for communication with a plurality of STAs, wherein the first subset is for communication with a first STA and is determined based on the allocation of the plurality of subsets, and wherein the communication of the at least one of data or control information in the first subset is with the first STA.

45. The apparatus of claim 44, further comprising means for transmitting a frame to the plurality of STAs, wherein the frame includes information indicating the allocation plurality of subsets.

46. The apparatus of claim 44, further comprising:

means for determining a second subset of RUs of the set of RUs for communication with a second STA of the plurality of STAs based on the allocation of the plurality of subsets, the second subset of RUs including less RUs than the set of RUs; and means for communicating at least one of data or control information in the second subset of the RUs with the second STA.

47. The apparatus of claim 44, wherein the communication with the first STA and the communication with second STA are concurrent.

48. The apparatus of claim 43, wherein the apparatus is a STA, the apparatus further comprising means for receiving a frame that includes information indicating allocation of the first subset of the set of RUs for communicating with the apparatus, wherein the first subset is determined based on the allocation.

49. The apparatus of claim 43, wherein the RUs of the set of RUs have a size of at least one of 26, 242, or 484 tones.

50. The apparatus of claim 43, wherein for each RU of the set of RUs that includes 26 tones, the 26 tones includes 24 data tones and 2 pilot tones.

51. The apparatus of claim 43, wherein for each RU of the set of RUs that includes 242 tones, the 242 tones include 234 data tones and 8 pilot tones.

52. The apparatus of claim 43, wherein for each RU of the set of RUs that includes 484 tones, the 484 tones include 468 data tones and 16 pilot tones.

53. The apparatus of claim 43, wherein the bandwidth is 20 MHz, 40 MHz, or 80 MHz.

54. The apparatus of claim 43, wherein the bandwidth is 20 MHz, wherein the set of RUs includes 9 RUs, wherein each RU of the set of RUs includes 26 tones, and wherein the channel includes a number of direct current (DC) tones, wherein one RU of the set of RUs includes a first part and a second part, and wherein the first part is above the number of DC tones in frequency and the second part is below the number of DC tones in frequency.

55. The apparatus of claim 43, wherein the bandwidth is 40 MHz, wherein the set of RUs includes 16, 17, 18, or 19 RUs, and wherein each RU of the set of RUs includes 26 tones.

56. The apparatus of claim 55, wherein the set of RUs includes 18 RUs.

57. The apparatus of claim 55, wherein the channel includes 5 or more direct current (DC) tones.

58. The apparatus of claim 43, wherein the bandwidth is 40 MHz, wherein the set of RUs includes 2 RUs, and wherein each RU of the set of RUs includes 242 tones.

59. The apparatus of claim 58, wherein the channel includes 5 or more direct current (DC) tones.

60. The apparatus of claim 43, wherein the bandwidth is 80 MHz, wherein the set of RUs includes 32 or more RUs, and wherein each RU of the set of RUs includes 26 tones.

61. The apparatus of claim 60, wherein the set of RUs includes 37 RUs.

62. The apparatus of claim 43, wherein the bandwidth is 80 MHz, wherein the set of RUs includes 4 RUs, and wherein each RU of the set of RUs includes 242 tones.

63. The apparatus of claim 43, wherein the bandwidth is 80 MHz, wherein the set of RUs includes 2 RUs, and wherein each RU of the set of RUs includes 484 tones.

64. A non-transitory computer-readable medium storing computer executable code for wireless communication at a wireless device, the wireless device being a station (STA) or an access point (AP), comprising code for:

determining a first subset of resource units (RUs) of a set of RUs that extends across a bandwidth of a channel in a transmission time period, the bandwidth comprising a plurality of tones, the plurality of tones including a number of direct current (DC) tones located at a central portion of the bandwidth, a first set of guard tones located at an upper outer edge portion of the bandwidth, and a second set of guard tones located at a lower outer edge portion of the bandwidth, the first subset of RUs including less RUs than the set of RUs, remaining RUs in the set of RUs other than the first subset of RUs being standard blocks, each RU of the set of RUs including at least 26 tones; and communicating at least one of data or control information in the first subset of the RUs, wherein the first subset of RUs includes x tones, and the x tones comprise a first set of x/2 tones with a frequency greater than the DC tones and less than the first set of guard tones and comprises a second set of x/2 tones with a frequency less than the DC tones and greater than the second set of guard tones, wherein:

the first subset of RUs is a center block, the first set of x/2 tones is adjacent in frequency to the DC tones and the second set of x/2 tones is adjacent in frequency to the DC tones, or the first subset of RUs is an edge block, the first set of x/2 tones is adjacent in frequency to the first set of guard tones and the second set of x/2 tones is adjacent in frequency to the second set of guard tones.

65. The non-transitory computer-readable medium of claim 64, wherein the wireless device is an AP, the computer-readable medium further comprising code for:
allocating the plurality of tones excluding the guard tones and the DC tones in the transmission time period to the set of RUs; and
allocating a plurality of subsets of the set of RUs for communication with a plurality of STAs, wherein the first subset is for communication with a first STA and is determined based on the allocation of the plurality of subsets, and wherein the communication of the at least one of data or control information in the first subset is with the first STA.

66. The non-transitory computer-readable medium of claim 65, further comprising code for transmitting a frame to the plurality of STAs, wherein the frame includes information indicating the allocation plurality of subsets.

67. The non-transitory computer-readable medium of claim 65, further comprising code for:
determining a second subset of RUs of the set of RUs for communication with a second STA of the plurality of STAs based on the allocation of the plurality of subsets, the second subset of RUs including less RUs than the set of RUs; and
communicating at least one of data or control information in the second subset of the RUs with the second STA.

68. The non-transitory computer-readable medium of claim 65, wherein the communication with the first STA and the communication with second STA are concurrent.

69. The non-transitory computer-readable medium of claim 64, wherein the wireless device is a STA, the computer-readable medium further comprising code for receiving a frame that includes information indicating allocation of the first subset of the set of RUs for communicating with the wireless device, wherein the first subset is determined based on the allocation.

70. The non-transitory computer-readable medium of claim 64, wherein the RUs of the set of RUs have a size of at least one of 26, 242, or 484 tones.

71. The non-transitory computer-readable medium of claim 64, wherein for each RU of the set of RUs that includes 26 tones, the 26 tones includes 24 data tones and 2 pilot tones.

72. The non-transitory computer-readable medium of claim 64, wherein for each RU of the set of RUs that includes 242 tones, the 242 tones include 234 data tones and 8 pilot tones.

73. The non-transitory computer-readable medium of claim 64, wherein for each RU of the set of RUs that includes 484 tones, the 484 tones include 468 data tones and 16 pilot tones.

74. The non-transitory computer-readable medium of claim 64, wherein the bandwidth is 20 MHz, 40 MHz, or 80 MHz.

75. The non-transitory computer-readable medium of claim 64, wherein the bandwidth is 20 MHz, wherein the set of RUs includes 9 RUs, wherein each RU of the set of RUs includes 26 tones, and
wherein the channel includes a number of direct current (DC) tones, wherein one RU of the set of RUs includes a first part and a second part, and wherein the first part is above the number of DC tones in frequency and the second part is below the number of DC tones in frequency.

76. The non-transitory computer-readable medium of claim 64, wherein the bandwidth is 40 MHz, wherein the set of RUs includes 16, 17, 18, or 19 RUs, and wherein each RU of the set of RUs includes 26 tones.

77. The non-transitory computer-readable medium of claim 76, wherein the set of RUs includes 18 RUs.

78. The non-transitory computer-readable medium of claim 76, wherein the channel includes 5 or more direct current (DC) tones.

79. The non-transitory computer-readable medium of claim 64, wherein the bandwidth is 40 MHz, wherein the set of RUs includes 2 RUs, and wherein each RU of the set of RUs includes 242 tones.

80. The non-transitory computer-readable medium of claim 79, wherein the channel includes 5 or more direct current (DC) tones.

81. The non-transitory computer-readable medium of claim 64, wherein the bandwidth is 80 MHz, wherein the set of RUs includes 32 or more RUs, and wherein each RU of the set of RUs includes 26 tones.

82. The non-transitory computer-readable medium of claim 81, wherein the set of RUs includes 37 RUs.

83. The non-transitory computer-readable medium of claim 64, wherein the bandwidth is 80 MHz, wherein the set of RUs includes 4 RUs, and wherein each RU of the set of RUs includes 242 tones.

84. The non-transitory computer-readable medium of claim 64, wherein the bandwidth is 80 MHz, wherein the set of RUs includes 2 RUs, and wherein each RU of the set of RUs includes 484 tones.

* * * * *